US 6,624,904 B2

(12) United States Patent
Kimizuka et al.

(10) Patent No.: US 6,624,904 B2
(45) Date of Patent: Sep. 23, 2003

(54) APPARATUS TO CONTROL OPTIONAL PAPER CONVEYANCE DEVICE AND IMAGE PROCESSING APPARATUS USING THE SAME

(75) Inventors: Junichi Kimizuka, Yokohama (JP); Shigeru Ueda, Wako (JP); Satoshi Nagata, Tama (JP); Akihiro Nakamura, Kawasaki (JP); Yoji Kaneko, Sagamihara (JP); Soya Endo, Tokyo (JP); Satoshi Egawa, Kawasaki (JP); Yoichi Toyokura, Yokohama (JP); Hitoshi Machino, Tokyo (JP); Shinichiro Maekawa, Kawasaki (JP); Yutaka Tokura, Machida (JP); Masaki Unishi, Kawasaki (JP); Akira Nakaya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/075,254

(22) Filed: Feb. 15, 2002

(65) Prior Publication Data

US 2002/0186391 A1 Dec. 12, 2002

Related U.S. Application Data

(62) Division of application No. 09/595,170, filed on Jun. 16, 2000, which is a division of application No. 08/600,050, filed on Feb. 12, 1996, now Pat. No. 6,373,581.

(30) Foreign Application Priority Data

| Feb. 10, 1995 | (JP) | ............................................ | 7-046462 |
| May 24, 1995 | (JP) | ............................................ | 7-149646 |
| May 30, 1995 | (JP) | ............................................ | 7-155359 |
| Feb. 9, 1996 | (JP) | ............................................ | 8-048193 |
| Feb. 9, 1996 | (JP) | ............................................ | 8-048194 |

(51) Int. Cl.[7] ............................................ G06F 15/00
(52) U.S. Cl. ...................... 358/1.12; 358/1.15; 358/1.13
(58) Field of Search ................................. 308/1.5, 1.11, 308/1.12, 1.13, 1.14, 1.15, 1.16, 296, 298, 400, 401, 407

(56) References Cited

U.S. PATENT DOCUMENTS

| 4,937,781 A | 6/1990 | Lee et al. ..................... 364/900 |
| 5,231,495 A | 7/1993 | Kaneko et al. ............. 358/160 |
| 5,321,486 A | 6/1994 | Nanbu et al. ................ 355/311 |
| 5,335,316 A | 8/1994 | Toyokura .................... 358/1.16 |
| 5,412,480 A | 5/1995 | Serizawa ..................... 358/296 |
| 5,418,904 A | 5/1995 | Tomiyasu .................... 395/133 |
| 5,446,832 A | 8/1995 | Higuchi ....................... 358/1.14 |
| 5,457,483 A | 10/1995 | Oikawa ....................... 358/296 |
| 5,464,204 A | 11/1995 | Suzuki ........................ 271/110 |
| 5,535,012 A * | 7/1996 | Matsumoto et al. ........ 358/400 |
| 5,563,986 A | 10/1996 | Suzuki ........................ 358/1.15 |
| 5,710,931 A | 1/1998 | Nakamura et al. .......... 395/750 |
| 5,964,851 A | 10/1999 | Ueda ........................... 710/17 |

* cited by examiner

Primary Examiner—Mark Wallerson
(74) Attorney, Agent, or Firm—Fitzpatrick, Cella, Harper & Scinto

(57) ABSTRACT

If an optional paper feeding deck or furnisher, or paper stacker, is connected to an image forming apparatus (such as a printer), such optional devices are to be controlled by connecting the paper conveyance control apparatus to control those options. Such an image forming apparatus has a video controller to convert the printer language sent from a high-order device such as a host computer, into a bit map data and a printer engine to print the bit map data. Such a paper conveyance control apparatus, being electrically connected to the video controller, has a memory to be shared with the video controller. The video controller writes the job schedule in the shared memory. The paper conveyance control apparatus controls the optional device according to the written job schedule.

38 Claims, 13 Drawing Sheets

APPARATUS TO CONTROL OPTIONAL PAPER CONVEYANCE DEVICE AND IMAGE PROCESSING APPARATUS USING THE SAME

CROSS REFERENCE TO RELATED APPLICATIONS

This application is a division of application Ser. No. 09/595,170, filed Jun. 16, 2000, which is a division of application Ser. No. 08/600,050, filed Feb. 12, 1996, now U.S. Pat. No. 6,373,581.

BACKGROUND OF THE INVENTION

1. Field of the Invention

This invention relates to an apparatus to control a paper conveyance device which is optionally connected to an image forming device and an image processing apparatus which uses the paper conveyance control apparatus.

The term paper conveyance device refers to paper ejecting or processing device such as a paper feeding device, paper ejecting device, stacker, or furnisher of the sheet on which the image is to be formed.

2. Related Background Art

Conventionally, in the image forming device using the electronic photographic system, the whole image forming device is controlled collectively as equipped with the image forming control device to control the whole electronic photographic process including paper feeding and ejecting processing. Additionally, if the paper feeding and ejecting devices are optionally added to the conventional device, those additional devices are connected to the image forming control device on a one-to-one basis.

Also, the commands to move the paper feeding and ejecting devices and the status information of those devices are given via the image forming control device.

In recent years, however, it has been requested to make common the image forming part which is the heart of the image forming device and recombine the paper feeding and ejecting devices to be attached around it according to need. Thus, it is necessary in the conventional configuration to replace the image forming control device itself or to incorporate the control programs and the interfaces of all the connectable paper feeding and ejecting devices into the image forming control device beforehand.

Additionally, the CPU of the image forming control device bears a heavy burden since the commands and statuses of the paper feeding and ejecting devices are given via the image forming control device. Recently there has been a request to display the movements and statuses of the image forming device in as detailed a manner as possible on a real-time basis to the user to promote user-friendliness. It has therefore become necessary to send every one of the status signals of the paper feeding and ejecting devices as well to the host computer side.

In such a case, the image forming control device existing between them incurs such problems as the communication speed becoming low or an insufficient amount of information being provided to the user. Also, to solve these problems, an expensive CPU must be used in the image forming control device, or the image forming control device must have a large-capacity random access memory to store the status information of the paper feeding and ejecting devices.

In attaching a paper ejecting device like the stacker to the image forming device like the page printer of the electronic photographic system, there are some types of such paper ejecting devices which have a job offsetting function to sort the paper ejecting output per series of jobs.

In the conventional example above, however, it becomes impossible to sort a job if another job is printed by interruption during sorting of the first job, since it is divided. Therefore, interrupted print cannot be used.

It is impossible to use the image forming device and the optional unit as combined if either one of them is changed. This is because of the difference in the paper conveying speed and path of each image forming device model and that in the paper conveying speed and path and paper processing time of the optional unit, e.g., the stapling processing and paper folding processing time of the furnisher and the sorting time of the sorter.

While it is not in principle impossible to program all such conceivable information in the memory of the CPU of the image forming control device memory beforehand, the optional unit is not always attached. So the image forming control device comes to bear an unnecessary load, which also raises the image forming control device cost. Additionally, while many variations are conceivable for the optional unit, it is very hard to cover them all since it is necessary to increase the capacity of the memory. While it is also conceivable to let the image information control device control the optional unit, the image information control device must process the image information to be printed at high speed. So there is a disadvantage of the image information processing time, which is important, becoming slow if the optional unit must be controlled in this fashion.

SUMMARY OF THE INVENTION

The first object of the invention, therefore, is to provide an image forming device to enable a rise of the essential printing operation speed of the image forming device. This is done by lessening the burden on the CPU on paper management for the image information control device and the image forming control device.

The second object of the invention is to provide an image forming device which enables to minimize the change in the image forming control device and the image information control device and to select their combination freely when optionally connecting the paper processing device, e.g., the paper feeding device and the paper ejecting device, to the image forming device.

The third object of the invention is to provide an image forming device which enables one to realize the fastest throughput with the paper conveyance control device determining the best printing timing according to the paper processing time of the optional unit, the paper conveying speed and paper conveying path length and the paper length and the printing mode of the image forming device and the optional unit by consistently and comprehensively managing the paper movement in the image forming device and the optional unit by providing a CPU dedicated to paper conveyance control.

The fourth object of the invention is to try to lower the interface circuit cost by connecting the image information control device and the random access memory by a serial transmission line by providing a shared random access memory between the image information control device and the paper conveyance control device.

To achieve the objects above, the invention, firstly, tries to raise the essential printing speed of the image forming device by dedicating the CPU of the image information control device to image information control and the CPU of the image forming device to image formation so as to release them from the management of the paper processing device.

The invention, secondly, facilitates recombination by minimizing the change in the image forming device and the image information control device by performing control suitable for the combination of the paper processing device and the image forming device even if they are recombined with the paper processing device determining the difference in their models and specifications.

The invention, thirdly, enables one to realize the fastest throughput with the paper conveyance control device determining the best printing timing according to the paper processing time of the optional unit, the paper conveying speed and paper conveying path length of the image forming device and the optional unit and the paper length and the printing mode by consistently and comprehensively managing the paper movement in the image forming device and the optional unit by providing a CPU dedicated to paper conveyance control.

The invention, fourthly, enables one to reduce cost by decreasing the number of signal lines by connecting the image information control device and the random access memory by a serial transmission line.

Another object of the invention is to provide an image forming device which enables it to inform the user quickly of the status of the image forming device.

Another object of the invention is to provide an image forming device which enables it to use the memory efficiently by reducing the time for the image information control device to occupy the memory.

Still another object of the invention is to provide an image forming device which makes throughput of the whole image forming device the fastest with the paper conveyance control device determining status of the paper feeding device and selecting the best paper feeding source.

To achieve the objects above, the invention, again, tries to raise the essential printing operation speed of the image forming device by dedicating the CPU of image information control device to image information control and the CPU of the image forming device to image formation so as to release them from the management of the paper feeding and ejecting devices as well as minimizing the change in the image information control device and the image forming control device by meeting recombination of the paper feeding and ejecting devices, if any, just by exchanging a program of the paper conveyance control device.

The invention, also, provides print permission information to enable to obtain the fastest throughput from the paper conveyance control device by consistently and comprehensively managing the paper movement in the image forming device by providing a dedicated CPU in the paper conveyance control device and controls the image forming device optimally.

The invention, also, obtains the fastest throughput by providing in the paper conveyance control device a memory which shares information with the image information control device and with the image information control device receiving the schedule of the page to be printed and with the paper conveyance control device moving the paper in advance of the printing operation. It is possible to inform the user quickly of the status of the image forming device by grasping every movement of the paper which moves in the image forming device and writing it quickly in the shared memory and passing the paper movement to the host computer side via the image information control device.

The invention, in addition, makes the time for the image information control device to occupy the image memory the shortest by providing information to enable to erase the data kept in the image memory for the image information control device to re-output the image at the occurrence of a jam or other error when the paper conveyance control device, grasping the movement of the paper which moves in the image forming device quickly, acknowledges that paper has been ejected normally.

In particular, as the image forming device becomes multifunctional and as the number of paper feeding and ejecting ports increases, the time for each sheet of paper to remain in the device comes to differ. The sheets of paper are not ejected in their order of having been fed. While conventionally the image memory is cleared after all sheets of paper have been ejected, it is possible to use the memory more effectively if the image memory of the sheet of paper ejected earlier is cleared earlier. The invention enables memory clearing per page by providing a RAM release flag per page.

In the invention, also, the paper conveyance control device determines the status of the paper feeding device and selects the best paper feeding source as it knows the printing schedule beforehand and as it grasps the status of the paper feeding device quickly. For example, it selects another substitutable paper feeding source if the designated paper feeding source runs out of paper and a paper feeding source with a higher conveying speed if one is available.

Still another object of the invention is to provide an image forming device which can permit interruption if interruption print is requested while printing a series of jobs. The invention is available not only in a stacker having the job offsetting function but also in a stacker having a stapling function that is selectable job by job.

To achieve the object above, the invention is equipped with a dedicated control device to perform paper conveyance control. Such a paper conveyance control device is called the Paper Handling Controller (hereafter abbreviated as the "PHC"). The PHC is equipped with a random access memory to be shared with the image information control device.

The job schedule is written in that memory from the image information control device. The PHC, seeing the schedule in the memory, checks if there is interruption print or not. If there is, it counts its number of pages and checks if the number of interruption pages is storable or not. If it is, it requests the image information processing device to store the interruption page. The PHC executes the original job schedule while storing the interruption page. If the original job is a staple command, for example, it executes interruption print as soon as one time of the stapling process ends. In that case, it is possible to output the stapling processed printed matter and the interruption printed matter to the same ejection tray. If there are too many interruption pages, if it is impossible to store or if the interruption priority is high, meanwhile, the PHC requests to execute interruption print, halts the original job and makes the interruption printed matter be output to another tray than for the printed matter of the original job.

DETAILED DESCRIPTION OF THE PREFERRED EMBODIMENTS

Embodiment 1 (Configuration)

Figure 1:
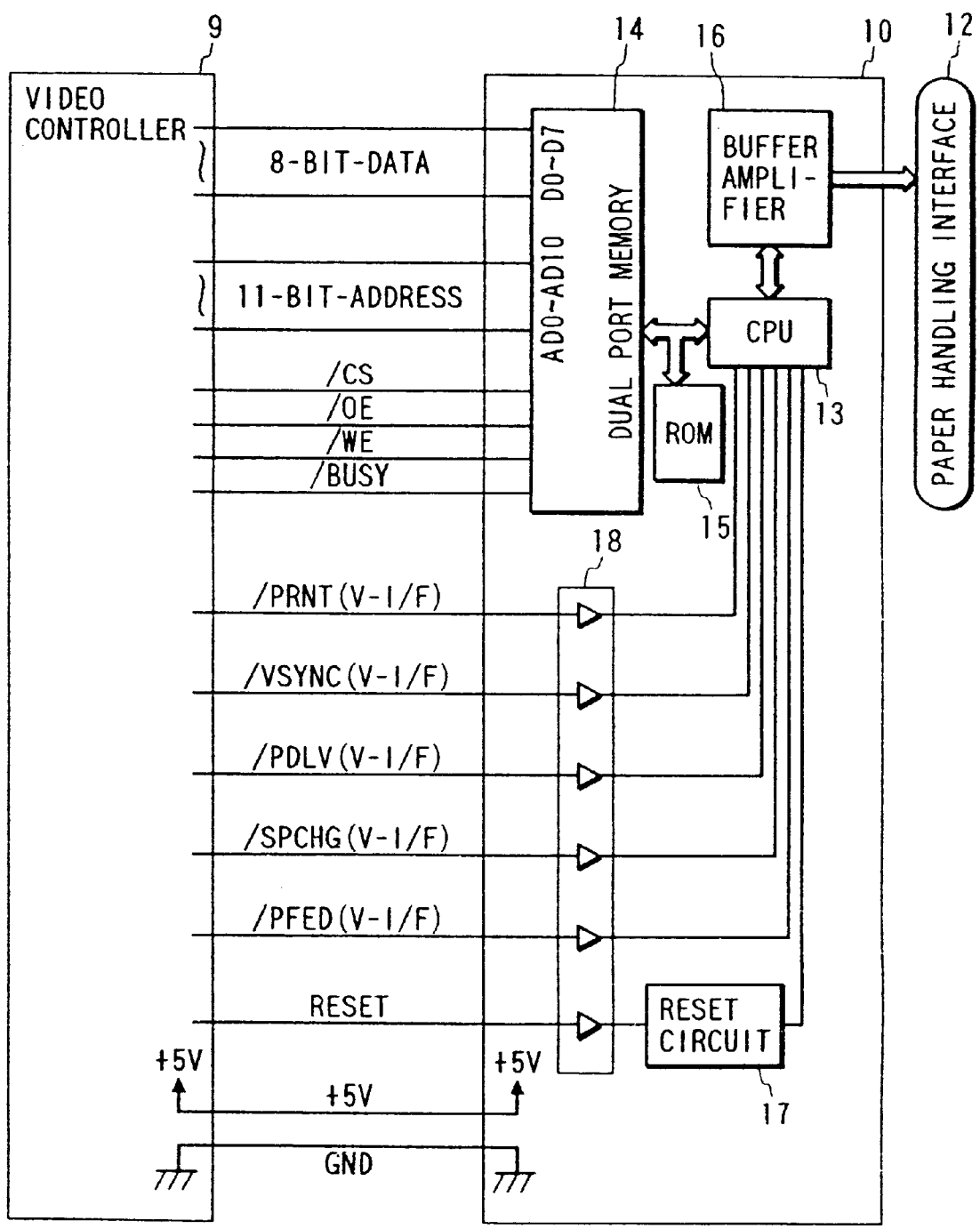
FIG. 1 is a circuit block diagram showing embodiment 1 of the invention.

FIG. 1 is a circuit block diagram of the paper conveyance control device (Paper Handling Controller: PHC) of the invention and shows connection interface of the image information control device (called the video controller). The overall configuration of the image forming device is explained referring to FIG. 2 before explaining FIG. 1.

Figure 2:
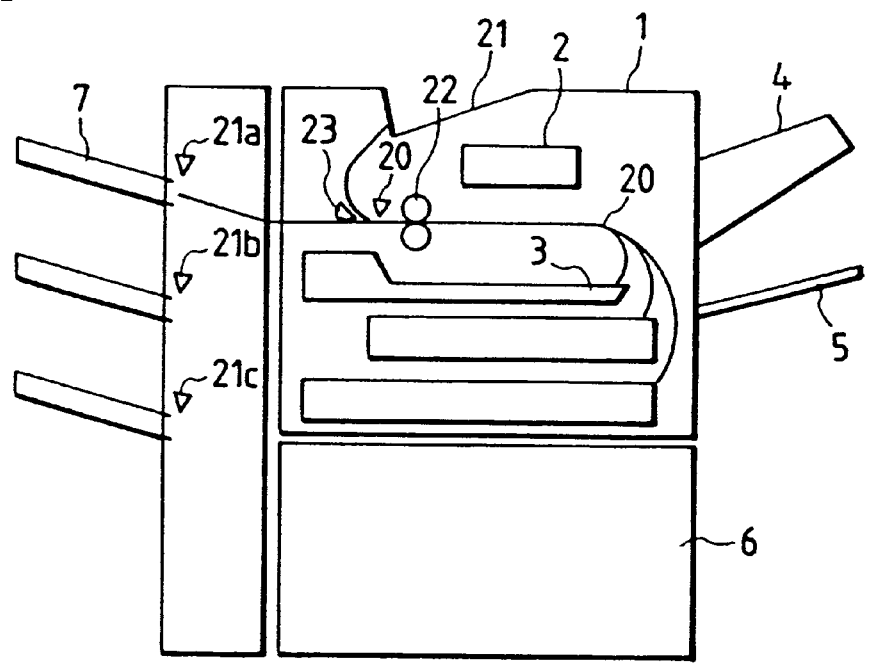
FIG. 2 is a general view of the image forming device.

In FIG. 2, 1 is a main body of the image forming device. It is a printer equipped with the laser beam writing device of the publicly known electronic photographic system. 20 is the paper conveying path. 21 is a face-down tray using the case of the main body 1. 22 is a fixer. The paper conveying path has a branching flapper 23, which branches in two after passing the fixer 22. 2 is a display part or unit in the main body. 3 is a two-side unit (a device to reverse a sheet of paper printed once, return it to the paper feeding port and make it be printed again on its reverse side). 4 is an envelope feeder (a paper feeding device for envelopes to be used when printing an envelope).

5 is a multi-path tray, used to feed a small amount of paper of indefinite forms. 6 is a large-capacity paper feeding deck. 7 is a staple furnisher (a paper ejecting device to staple or stack the paper ejected from the main body). Of those, devices 3, 4, 5, 6 and 7 are optional devices available separately from the main body 1.

Figure 3:
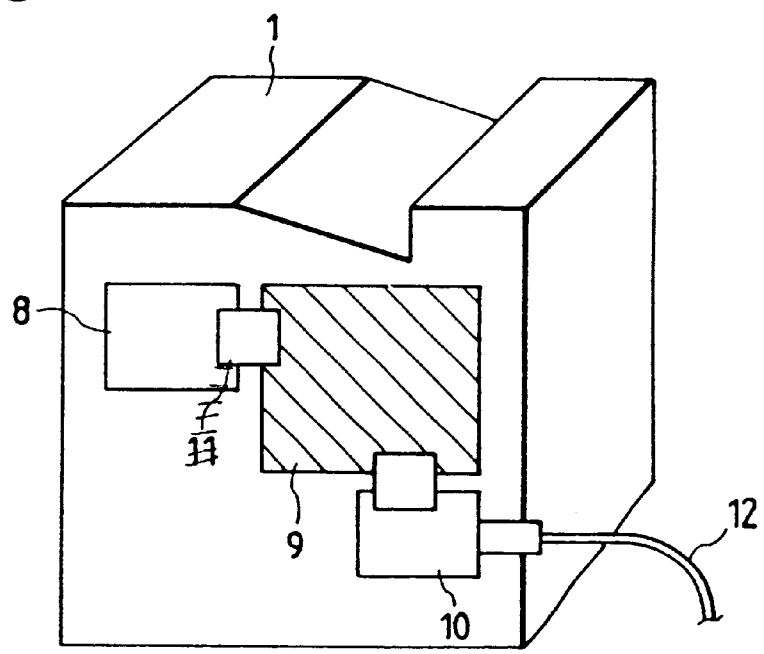
FIG. 3 is a layout view of the major control devices of the invention.
Figure 4:
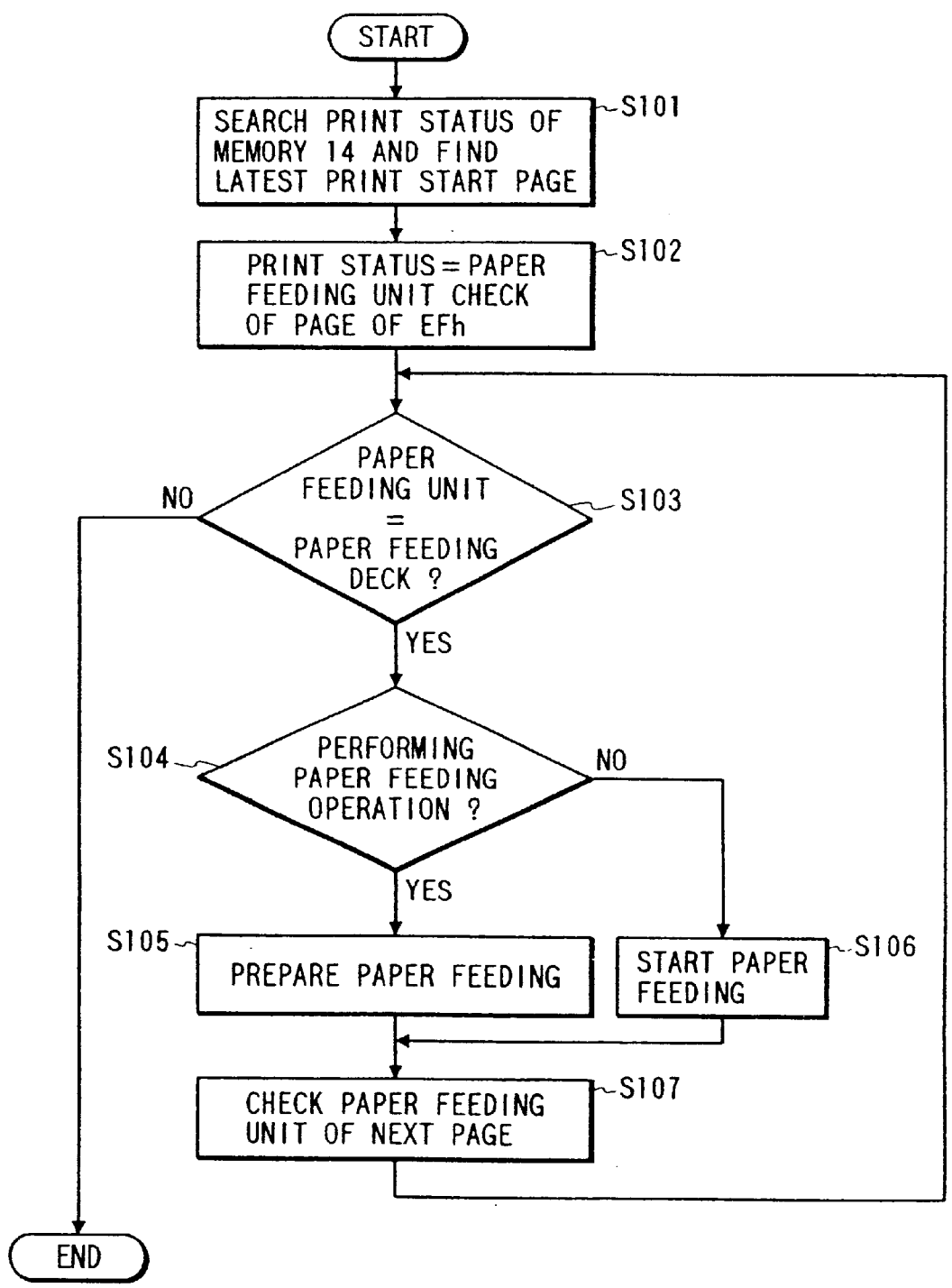
FIG. 4 is a flowchart of embodiment 2.

Next, the layout relationship of the control devices is explained referring to FIG. 3. 8 is an image formation control part which controls the image forming device of the main body. It is generally called the engine controller. It controls the electronic photographic process and the two-side operation of the main body unit the paper feeding of the envelope feeder and the paper feeding conveying timing. 9 is an image information control device. It is generally called the video controller. Upon receiving data to be printed (e.g., data described in the printer description language) from the host computer, it creates the image information (dot information) to be printed.

10 is a paper conveyance control device. It is generally called the Paper Handling Controller (PHC). It consistently and comprehensively controls the paper feeding deck 6 and the furnisher 7. 12 is an interface cable connecting the paper feeding and ejecting devices and the PHC. It is called the paper handling interface.

Turning back to FIG. 1, its content will be described. In FIG. 1, a CPU 13 is, for example, an 8-bit microcomputer. 14 is a dual port memory which is a kind of random access memory. It has the arbitration function. 15 is a read only memory. Being attached to a socket, it is replaceable. 16 is a buffer amplifier for the interface. 17 is a reset circuit. It is to be reset by the reset signal/RESET from the exterior. 18 is a buffer amplifier for the interface.

The major configuration of the PHC 10 has been explained. The CPU 13 performs communication with the paper feeding and ejecting devices via the paper handling interface 12 and controls the optional device such as the paper feeding deck 6, the paper ejecting device 7, etc., as well as collecting status information of those devices. Also, the CPU 13 exchanges information with the video controller 9 via the dual port memory. Additionally, the CPU 13 determines the paper feeding and ejecting timing by taking in what has been branched from the video interface signal/PRNT, /VSYNC, /PDLV, /SPCHG, /PFED between the video controller 9 and the engine controller 8.

The types of signals are shown below.

D0–D7: 8-bit data line for dual port memory

AD0–AD10: 11-bit address line for dual port memory

/CS: Chip select line for dual port memory

/OE: Output enable line for dual port memory

/WE: Write enable line for dual port memory

/BUSY: Busy line for dual port memory

/PRINT signal: Print command given to engine controller 8 by video controller 9

/VSYNC signal: Feed synchronizing signal given by engine controller 8

/PFED signal: Paper feed prompting signal given to paper feeding deck 6 by engine controller 8

/SPCHG signal: Signal to command to equalize paper conveying speed given to paper feeding deck 6 by engine controller 8 to a conveying speed /PDLV signal of the main body: Signal to inform of timing for engine controller 8 to eject paper through main body outlet /RESET signal: Signal to reset the CPU of the option controller in terms of hardware Incidentally, the symbol "/" implies low level active.

An example of configuration for the PHC 10 above not to use the dual port memory 14 is described later (embodiment 2). If not using the dual port memory 14, the content explained below is written in the ordinary memory (RAM) as described later.

Next, the information exchange between the video controller 9 and the PHC 10 via the memory 14 is described in a little more detail. The dual port memory 14 has the following three types of areas:

1 Conveying situation management area O00h–3D1h

2 Command and status management area 400h–7FDh

3 Starting processing area 7FEh–7FFh

The conveying situation management area and the command and status management area are defined separately from one another below.

The conveying situation management area is used to designate the paper conveying operation.

The command and status management area is used to manage in detail the configurations (connected situation) and statuses of the paper feeding and ejecting devices.

Also, the conveying situation management area alteration request command is used to alter the data of the conveying situation management area which was once written. Such a command is processed as one of the ordinary commands using the command and status management area.

Conveying situation management area:
(1) The video controller 9 commands to start the operation by writing the paper feeding port, the paper size, the paper ejecting port and the paper ejecting process in the conveying situation management area per (i.e. for each) print image.
(2) The PHC 10 manages the whole paper conveyance while controlling the paper feeding deck 6, the main body 1 and the paper ejecting furnisher 7 following the command above. The PHC 10 notifies the video controller of the paper conveying status on a real-time basis.
(3) The video controller notifies the PHC 10 of the paper feeding and ejecting and print starting statuses of the main body on a real-time basis. The PHC 10 grasps all paper conveyance information by that information.
(4) As a result of the conveying situation management area using a memory equivalent to 40 sheets like a ring, information of the latest 40 sheets is always shared by the video controller 9 and the PHC 10.

Command and status management area:
(1) The video controller 9 writes command data in the command area and notifies the PHC 10 by the condition flag.
(2) The PHC 10 acknowledges the arrival of the command by the condition flag, performs the process and then writes status data in the status area and notifies the video controller by the condition flag.
(3) The command is written always from the video controller side.
(4) The status which corresponds to the command is always returned from the PHC 10.
(5) Connection information (configuration) at device start, detailed information of jam at its occurrence and detailed information of fault are acquired using the command and status management area above.

Tables 1 and 2 on separate sheets show some examples of use in the conveying situation management area. They show examples of conveying eight sheets with 16 images using the two-side unit 3. The item numbers and their names and outline in that memory are shown in Tables 3 to 6. "C" and "OC" in the "DATA DIRECTION" column of the tables represent the video controller 9 and the PHC 10 respectively.

Tables 1 and 2 are explained below. When printing, the video controller 9 first designates the image number, the paper number, the copy number, the job number and the paper size for item numbers 1 to 6 of the condition designated area. Physical address 000h is started with for page 1. The execution flag implies to start executing as soon as the conditions are met if 1 is designated.

Then the printing conditions are to be designated and the paper feeding condition, i.e., the paper feeding source, is to be designated. Then the paper ejecting conditions are to be designated. Paper ejecting unit two-side implies to print the paper on page 1 (the front side) of front-side print and then to put it into the two-side unit and reverse it, feed it again and to print page 2 (the reverse side).

Up to item number 15 are to be designated by the video controller 9. When designated up here, the paper handling controller 10 gives commands to the paper feeding deck 6 and the furnisher 7 according to the designated items. The print permission flag is turned 00h (OK) if the paper feeding and ejecting devices are ready.

Upon seeing it, the video controller 9 gives the print signal/PRNT to the engine controller. That signal is checked also by the CPU 13 to acknowledge that the printing operation has been started. Additionally, the video controller 9 writes operation start 1h in item number 20 print status.

When it has been started to feed paper, the PHC 10 writes paper feed execution 2h in the item number 19 of the memory 14 if paper feed from the paper feeding deck side and the video controller 9 writes the paper feeding operation execution 10h of the main body at the same address if paper feed on the main body side.

Thus it has been so arranged that both the PHC 10 and the video controller 9 can know what the present situation is no matter if paper feed managed by the PHC 10 or if the paper feed of the main body is not managed by the PHC. It is a merit of sharing information by the memory.

For the paper ejection of the main body 1, the engine controller 8 outputs the PDLV signal with the sensor 20 at the outlet of the fixer 22 in FIG. 2 detecting it. The paper ejection of the furnisher 7 is detected by the sensor 21a to 21c at the outlet to each tray.

When paper has been ejected, the paper ejection of the main body and the paper ejection of the furnisher are determined by the PHC 10 and the data is written in the item number 20 of the memory 14 the paper ejection status. For the paper ejection of the main body, the PHC 10 determines the PDLV signal of the video interface. For the paper ejection of the furnisher, the PHC 10 determines the paper ejected signal from the furnisher 7.

When paper has been ejected, the PHC 10 writes end in the item number 21 of the memory 14. In the tables, "START" and "0" imply operation started and unstarted respectively. When the paper ejecting operation has completed, the PHC writes OK (01h) in the RAM release of the item number 17 of the memory 14. That information is written per image number, i.e., per page.

It means that it is all right to erase per page the image memory on the written page stored in the video controller 9 for reprinting at the occurrence of print error since it has become unnecessary. The video controller 9 erases the memory after acknowledging that there is no jam or print error in the status. Without that information, the video controller 9 must store image information forever, so it is impossible to use the memory effectively.

This invention enables one always to know the RAM releasing timing per page in the table of the memory 14. In using the memory 14 in the present invention, there is a rule to proceed with addresses in the order of pages, but the reading and writing procedure for each item may be random.

It is therefore possible to check the print status and the progress of the designated page through all the pages on a real-time basis. It is possible to send that information to the host computer side via the video controller as well as displaying it on the main body display part 2. As a result, the user can know the print status of all the paper in the image forming device easily.

Example of Operation 1

The information exchanging system between the PHC 10 and the video controller 9 via the memory 14 has been explained. Next, an embodiment of paper conveyance control which is realizable as a result of the PHC 10 referring to the paper handling schedule of the memory 14 is explained. Regarding the information exchanging system, incidentally, it is possible to realize the operation below also by using the method of the embodiment 2 described later.

In the present invention, the PHC 10 can receive the schedule for a plurality of sheets of paper planned to be printed from the video controller 9 beforehand. It means that it is possible to feed out paper earlier in time if the paper conveying distance from the paper feeding deck 6 placed under the main body 1 to the main body 1 is long.

In Table 1, for example, image number 8 is the paper feeding number 1 unit (the paper feeding deck 6 in this embodiment), the next is two-side and the next is paper feeding number 1 again. In such a case, first paper is fed out from the paper feeding deck. That paper is stopped at the inlet of the main body 1. Now another sheet of paper is fed immediately from the paper feeding deck if the paper conveying path is so long that two sheets of paper can exist in the conveying path.

Such advance paper feed is possible since the paper handling controller 10 knows the paper feeding schedule beforehand.

The advance paper feeding procedure of the PHC 10 will now be explained referring to a flowchart. In the step S101, search the print status the memory 14 and find the latest print start page. In the step S102, check the paper feeding unit designation for the page of the print status being FFh (the start status). If paper feeding deck designation in the step S103, check if the paper feeding deck is executing the paper feeding operation or not in the step S104. If YES, prepare for paper feed in the step S105 and execute paper feed after the specified period of time. If NO, start feeding paper immediately in the step S106. Check the paper feeding unit of the next page in the step S107 and return to the step S103.

Example of Operation 2

Figure 5:
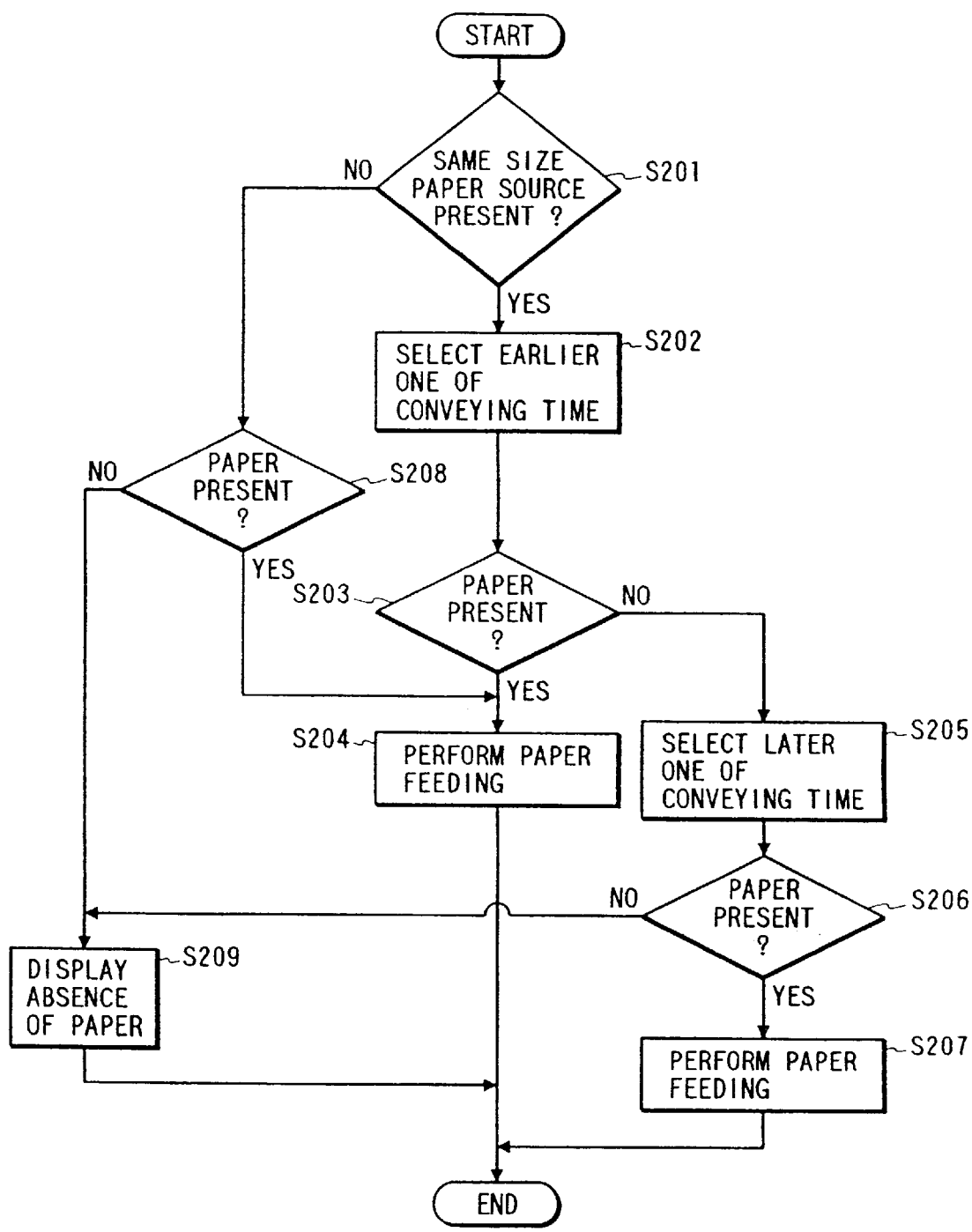
FIG. 5 is a flowchart of embodiment 3.

Next, an embodiment for further improving the efficiency in advance paper feed is explained. It is a case of having a paper feeding part with a plurality of stages in the paper feeding deck. The explanation is made referring to the flowchart of FIG. 5. It is to be used alongside the advance paper feed of embodiment 2. In the step S201, search for a paper feeding source of the same size (the PHC 10 checks and stores each paper size of the paper feeding source beforehand). If any, select the paper feeding source with a faster conveying time in the step S202. Each paper feeding source's conveying time has been stored in the paper feeding device, so the PHC 10 reads it via the interface line 12 beforehand.

In the step S203, check if paper is present or not in the faster paper feeding source. If present, feed paper is in the step S204. If paper absent in the step S203, select the slower paper feeding source in the step S205. In the step S206, check if paper is present or not. If present, feed paper in the step S207.

If there is no paper feeding source of the same size in the step S201, it is possible to specify the paper feeding source. So check if paper is present or not in the step S208. If present, feed paper in the step S204. If absent, display paper absent in the display part 2 in the step S209. It is to be displayed at a timing just before the paper feeding operation is actually started in that paper feeding source, however. This is because the user gets confused if displayed too much in advance of paper feed.

It is thus possible to arrange things so as to obtain the fastest throughput by selecting the paper feeding source making use of the allowance in time of advance paper feed. It is possible also because the PHC 10 can read the paper feeding schedule by the memory beforehand. Also, it is possible to switch to another paper feeding source in advance and with an allowance in time when paper is absent.

Example of Operation 3

While it is put in the explanation above that the memory 14 is to be read and written randomly, the operation is started as partly undesignated in some cases if the PHC reads and executes a designated item while it is being designated, for example while the video controller 4 is designating a paper feeding or ejecting condition.

Its countermeasure is explained. Table 3 shows the definition of the item number 1 of the memory 14, providing execution flag in Table 1. A designation that "2 . . . paper feeding and ejecting condition data is written but the operation is not made" is provided in the details of the content of data in Table 3.

When writing a designated item in the memory 14, namely, the PHC 10 does not start operating if the data of 02h is written in the execution flag of the relevant page just before it and then the designated item is written. Therefore, the PHC 10 does not move as partly undesignated.

Alternatively, it is possible as well to so arrange that the PHC 10 does not operate before an execution command is hoisted in the execution flag. Namely, the content of the data of the execution flag in Table 3 reads "1 . . . execute normal operation according to data". Namely, the PHC 10 does not start operating before the data of 01h is written in the execution flag.

Figure 6:
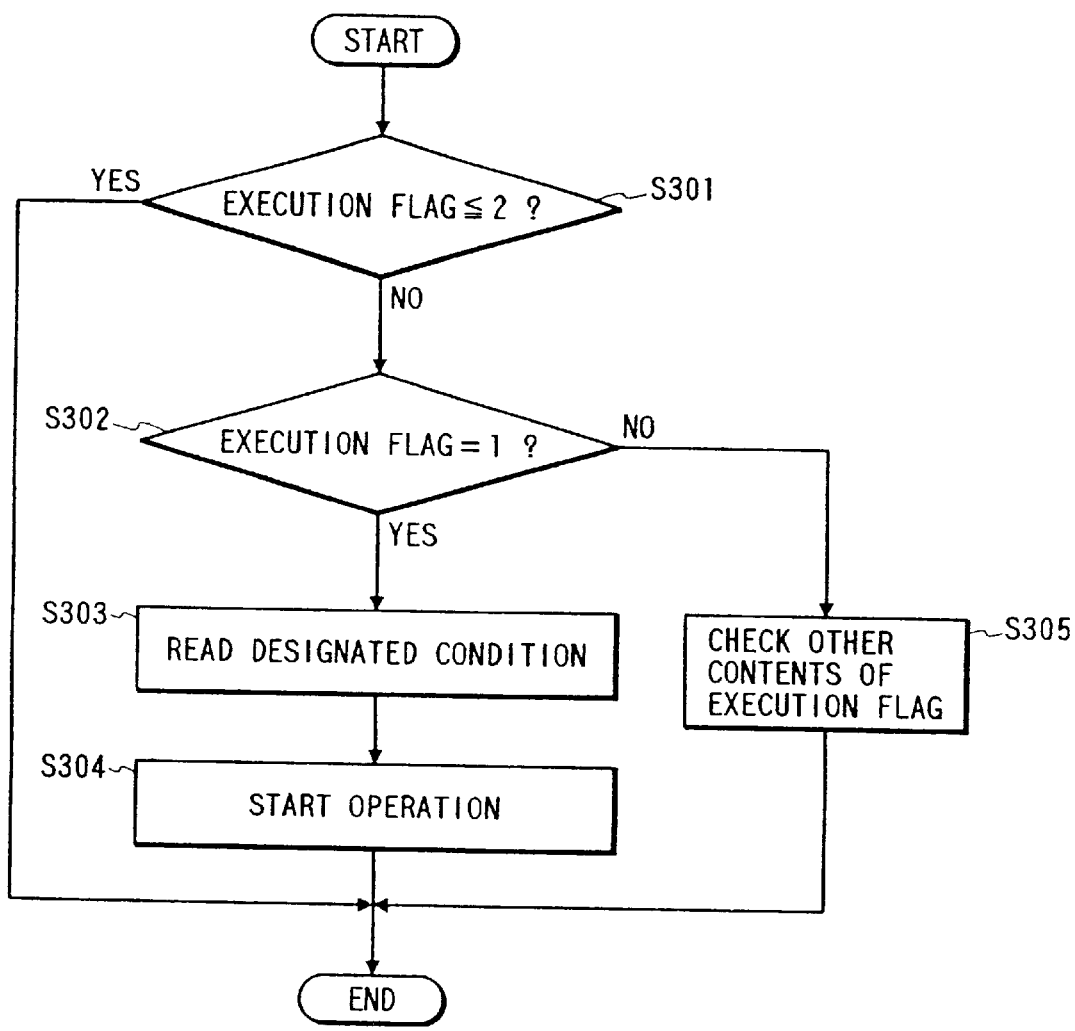
FIG. 6 is a flowchart of embodiment 4.

The flowchart of FIG. 6 shows an operation of the PHC 10 in that case. In the step S301, the CPU 13 of the PHC 10 reads the item number 1 execution flag of the memory 14 and checks if it has turned 02h or not. If YES, pass without doing anything.

If NO, check if the execution flag is 01h or not in the step S302. If YES, read the designated conditions such as the paper feeding condition, paper ejecting condition, printing condition designation, etc. in the step S303 and start the designated operation in the step S304.

If NO in the step S302, further analyze the other content 03h–06h of the execution flag in the step S305. While 02h is checked in this embodiment, it is possible as well to start executing the operation by checking 01h only.

(1) Paper conveyance control schedule management has become possible on the paper conveyance control device side as a result of exchanging information by providing a shared memory between the image information control device and the paper conveyance control device. As a result, it has become possible to advance feed a plurality of sheets of paper. As a result, it has become possible to print without affecting the throughput even if paper feeding devices with long conveying paths are combined.

(2) Advance paper feed generates an allowance in time. As a result, it has become possible to obtain the fastest throughput by selecting the best paper feeding source.

(3) The paper conveyance control device specializes in controlling paper and informs the image information control device of the controlling timing. As a result, it has become possible to raise the image information processing speed thanks to the image information control device being released from paper conveyance control.

(4) The paper conveyance control device writes the movement of all the paper in the image forming device in the shared random access memory and the image information control device displays it to the user. As a result, the user can know the movement of paper in the image forming device as if he held it in his hand.

(5) It is possible to prevent the paper conveyance control device from starting operating while a designated condition is being written by displaying that the image information control device is writing a designated condition or by writing an operation start command in the memory by providing an execution flag in the shared memory. It is very effective for preventing trouble due to enabling random access with a shared memory.

(6) It has become possible to use the image memory efficiently as a result of detecting paper conveyed per page and informing of the result thereof by writing it in the random access memory per page to enable to release the image memory per page.

Example of Variation 1

Next, a part of the conveying situation management area of the memory 14 is explained referring to Table 7 on a separate sheet. The physical address implies the address of the memory. One horizontal line of the table represents information for one page of paper. The condition designated area designates the condition given by the video controller 9. Of the condition designation, only the part concerning the present invention is extracted for explanation.

Item number 1, being the execution flag, commands the PHC 10 to start executing if "1" is hoisted. Item number 2 is the image number. Item number 5 is the job number. Item number 10 is paper ejecting unit designation. When number 1, furnisher 7 designation. When number 2, main body tray 21 designation. Item number 13 being furnisher process designation, stapling is to be designated here.

Now the status notification area is a part where the video controller 9 and the PHC 10 notify of their respective statuses. Item number 17 is the print permission flag. Its OK implies that the PHC 10 has ended the preparing process required, so that it is all right to give a print command. Item number 23 was provided anew in this example of variation. It implies the interruption process. 01h implies that the PHC 10 requests the video controller to store. It implies to continue the original job while storing.

02h requests to designate the paper ejecting port at a separate place from in the original job since interruption is to be executed first. 03h implies interruption process impossible. Table 1 shows an example of designation up to image number page 16. Pages 8, 9 and 10 are interruption pages. The status is such that the PHC 10, which checked it, involves interruption of only three pages, that the processing of job number 1 involves only the three remaining pages of pages 11, 12 and 13, that the process is given priority and that the video controller 9 is being requested (the interruption process being 01h) to store the interruption page. A condition of being about to execute the stapling process of page 13 is shown. The print permission flag of the interruption of job number 2 turns OK when that stapling process ends.

Figure 7:
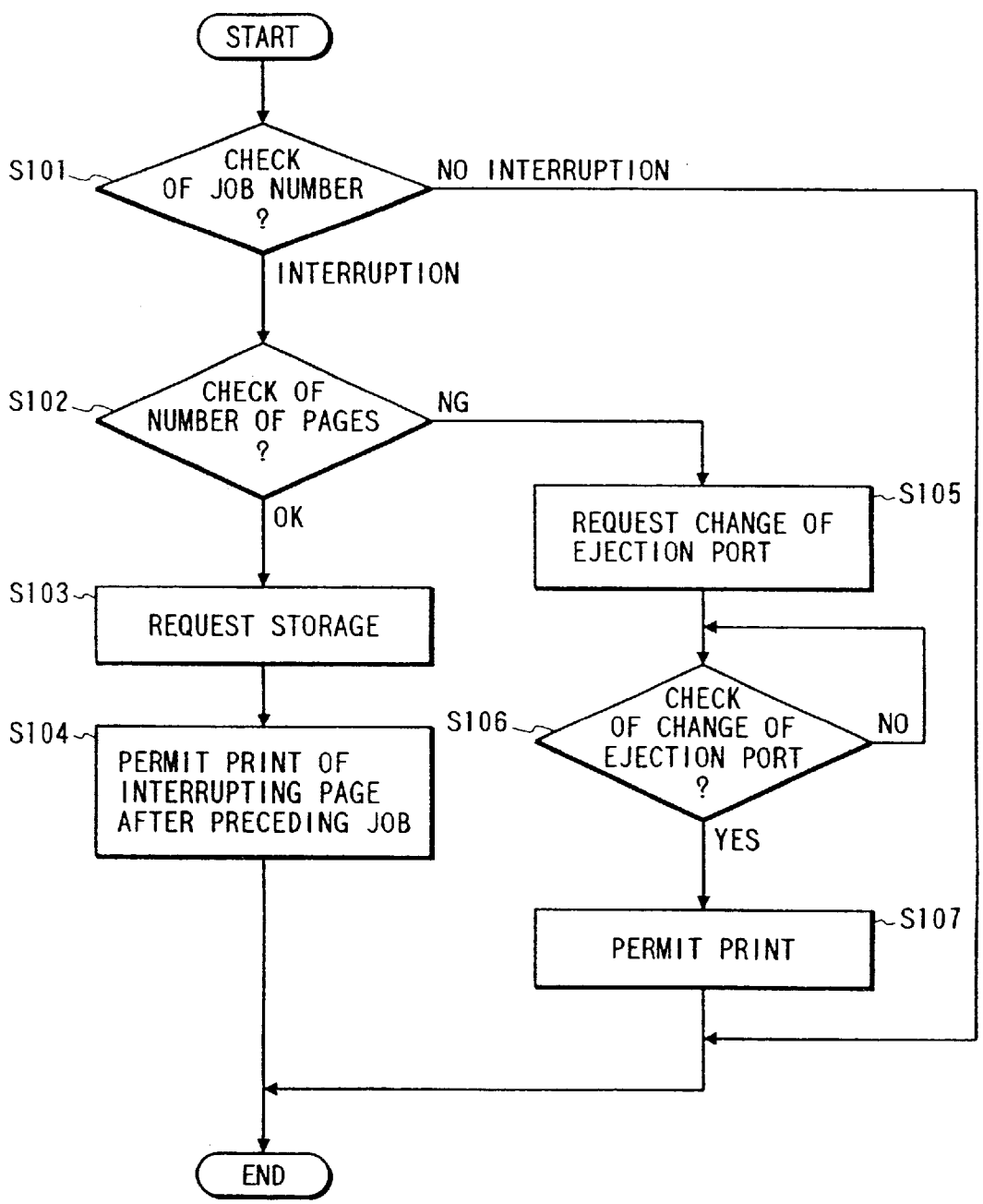
FIG. 7 is a flowchart of embodiment 5.

Next, the movement of the CPU 13 of the PHC 10 is explained referring to the flowchart of FIG. 7. In the step S101, search the job numbers of the conveying situation management area of the memory 14. If the job numbers discontinue, check whether it is interruption or not. If there is interruption, check the number of interruption pages in the step S102. Give a store request in the step S103 when the PHC 10 determines that it doesn't matter if image data for that amount, having turned out to be few pages, is stored in the memory of the video controller 9.

It means writing 01h at the memory address of the relevant page in the interruption process of the item number 23 of the memory 14. And, in the step S104, turn the print permission flags of the interruption page OK (01h) one by one after ending the job before the interruption. Request to change the designation of the paper ejecting port in the step S105 when determined in the step S102 that there are too many pages. It means writing 02h at the memory address of the relevant page in the interruption process of the memory 14.

In the step S106, check the change in the designation of the paper ejecting port and wait until changed. Pass here immediately if the designation of the paper ejecting port (the designation of the item number 10 of the memory 14) of the interruption page is different from the designation of the paper ejecting port of the preceding job. Then turn the print permission flag of the interruption page OK in the step S107. Thus the interruption page is ejected to a separate outlet from in the preceding job, so it is prevented to get confused with the preceding job. In the example of Table 1, the interruption page outlet is designated to be the main body tray, so it doesn't matter if the interruption process is executed first.

Example of Variation 2

Figure 8:
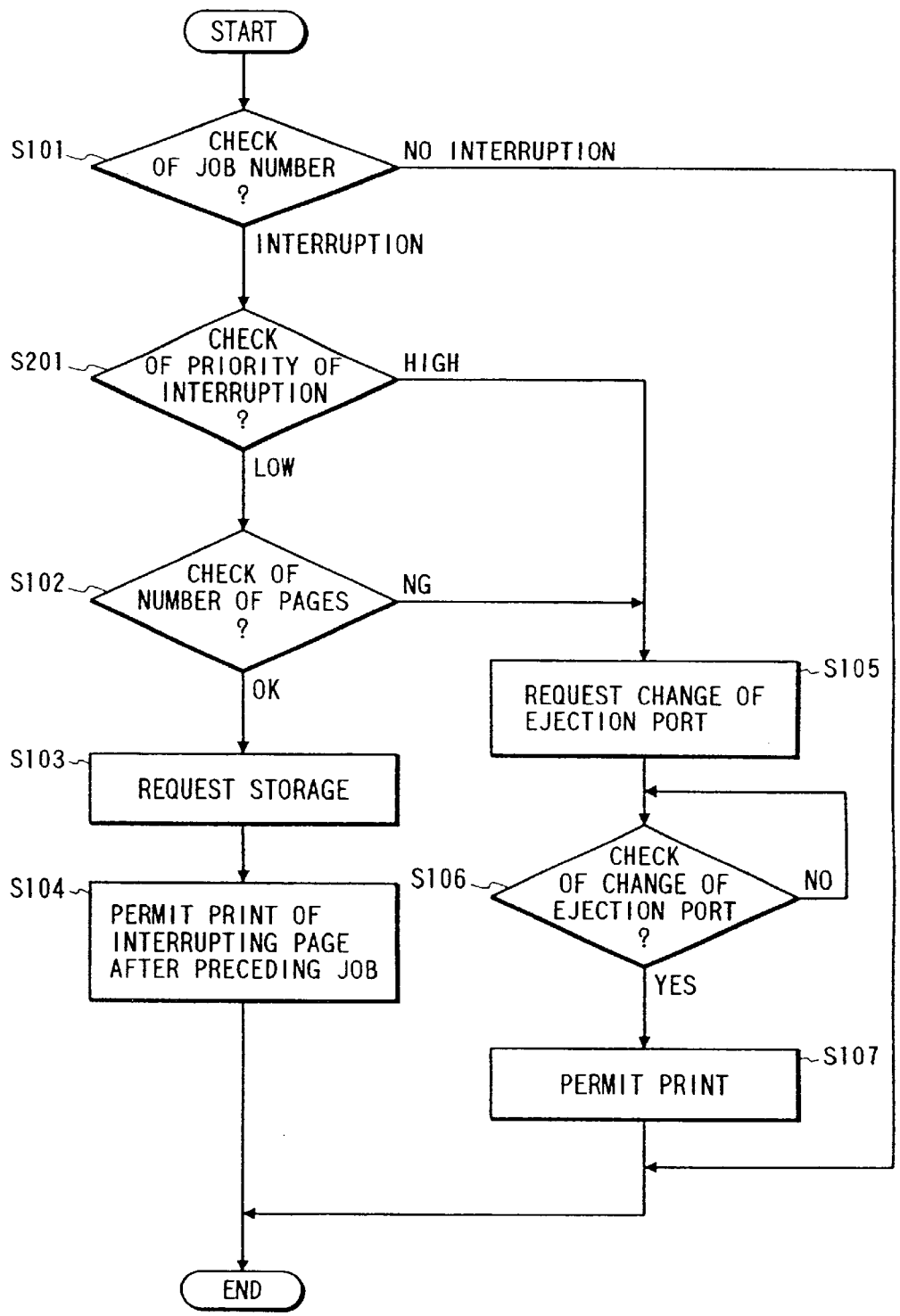
FIG. 8 is a flowchart of embodiment 6.

While designation of the priority of interruption is not considered in the example of variation 1 above, it is possible to assign priority to interruption print in this example of variation 2. For that, the designation column is to be provided by increasing an item number in the memory 14. Priority determination is to be provided by such designation. FIG. 8 shows that situation. Check the priority level by providing the step S201 between the steps S101 and S102 in the flowchart of FIG. 7. If the priority is high, the paper ejecting port change request in the step S105 is forcibly gone to.

Example of Variation 3

Figure 9:
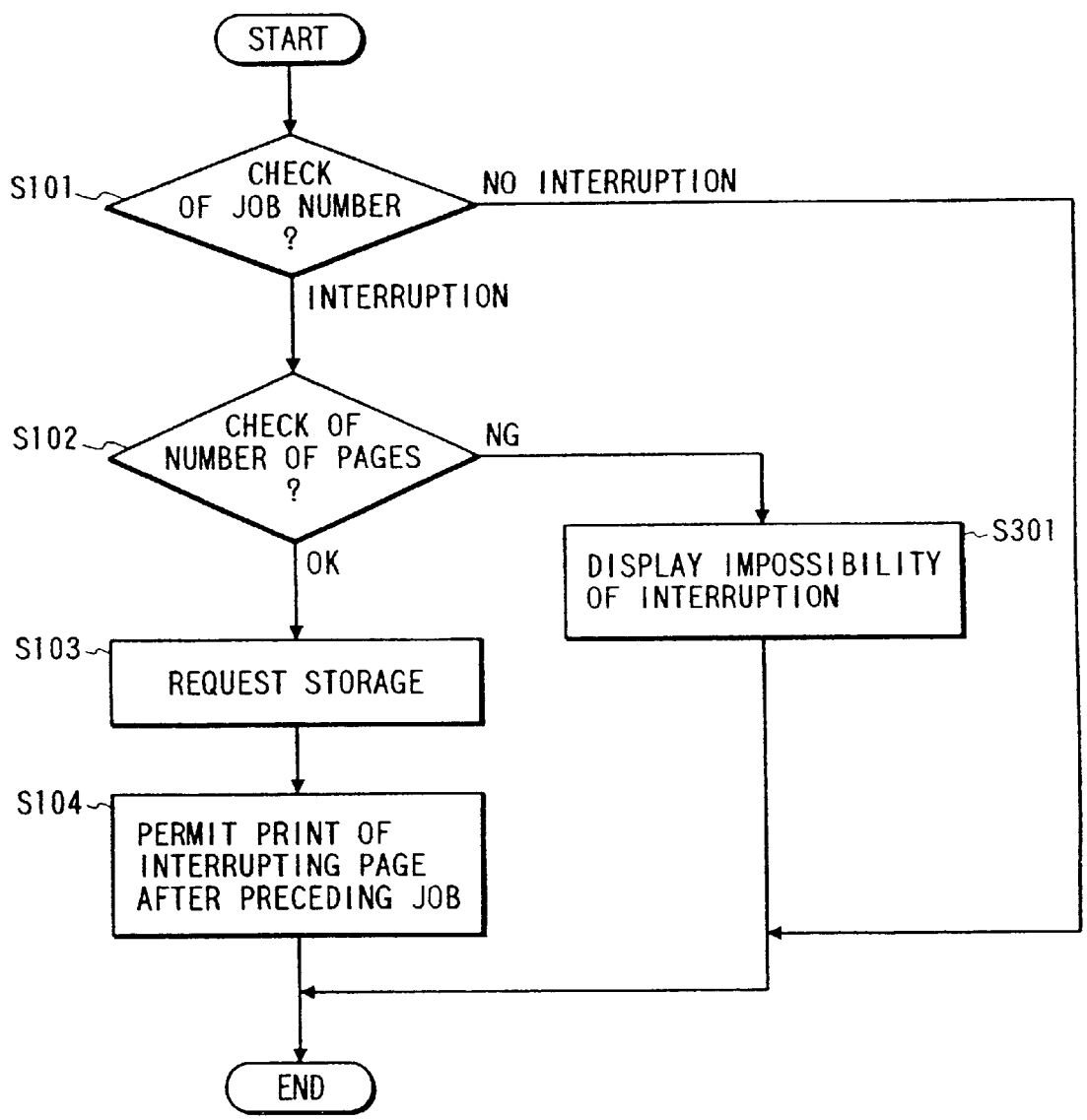
FIG. 9 is a flowchart of embodiment 7.

In the example of variation 3, it is possible just to assume interruption impossible without accepting interruption when there are too many interruption pages in the step S102. FIG. 9 shows it. If NG in the step S102, display interruption impossible in the step S301. It means writing 03h on the relevant page in the interruption process column of the item number 1 in the memory 14 relevant page. In that case, interruption print is not executed before the present job ends.

As explained above, it has become possible, as in examples of variation 1–3, to determine whether to perform interruption print or not according to the order of the job number by providing a control device dedicated to paper conveyance and installing a shared memory between it and the image information control device to enable to manage the job schedule. Also, it having become possible to determine the scale of interruption print according to the job schedule table, it has become possible to make adequate determinations such as, for an interruption print request, to end the preceding job first by storing the portion of interruption print temporarily in the memory or to process the interruption print first and to eject its portion to a separate ejection port and so on.

Embodiment 2

Figure 10:
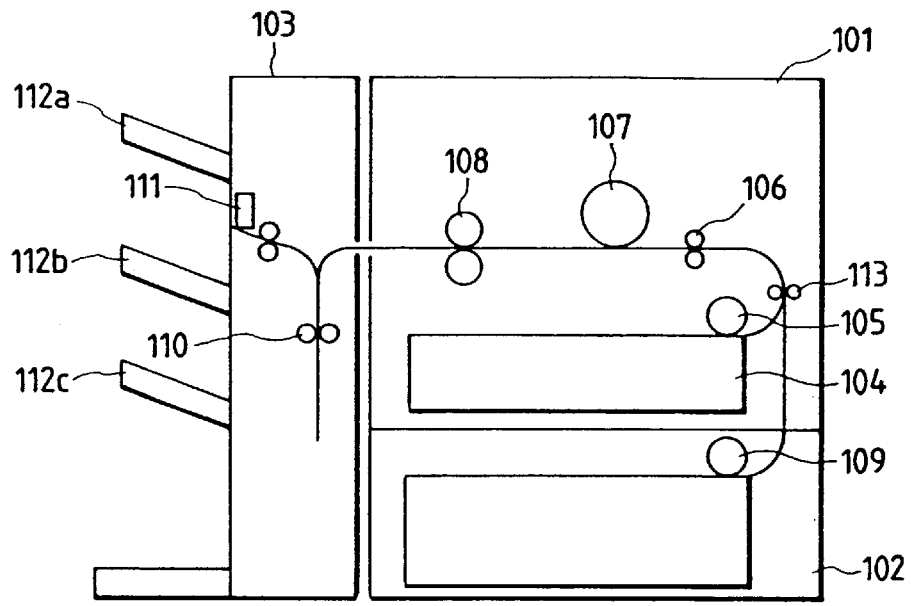
FIG. 10 is a schematic side view showing the overall configuration of the image forming device of embodiment 8 of the invention.

FIG. 10 is a schematic sectional view showing the image forming device's overall configuration. In it, 101 is the main body of the image forming device, 102 is the optional paper feeding deck and 103 is the optional furnisher, which has the stapler 111. In the main body 101 of the image forming device, the paper feeding cassette 104, the paper feeding roller 105, the conveying roller 113, the registration roller 106, the photosensitive drum 107 and the fixer 108 are arranged along the paper conveying path. In the paper feeding deck 102, paper is stacked on the lifter and is fed out by the paper feeding roller 109. In the furnisher 103, the paper reversing part 110 and the stapler 111 are installed. Also, three paper ejecting trays 112a–112c are laid out as movable. It has been so arranged that the trays load paper while moving.

Figure 12:
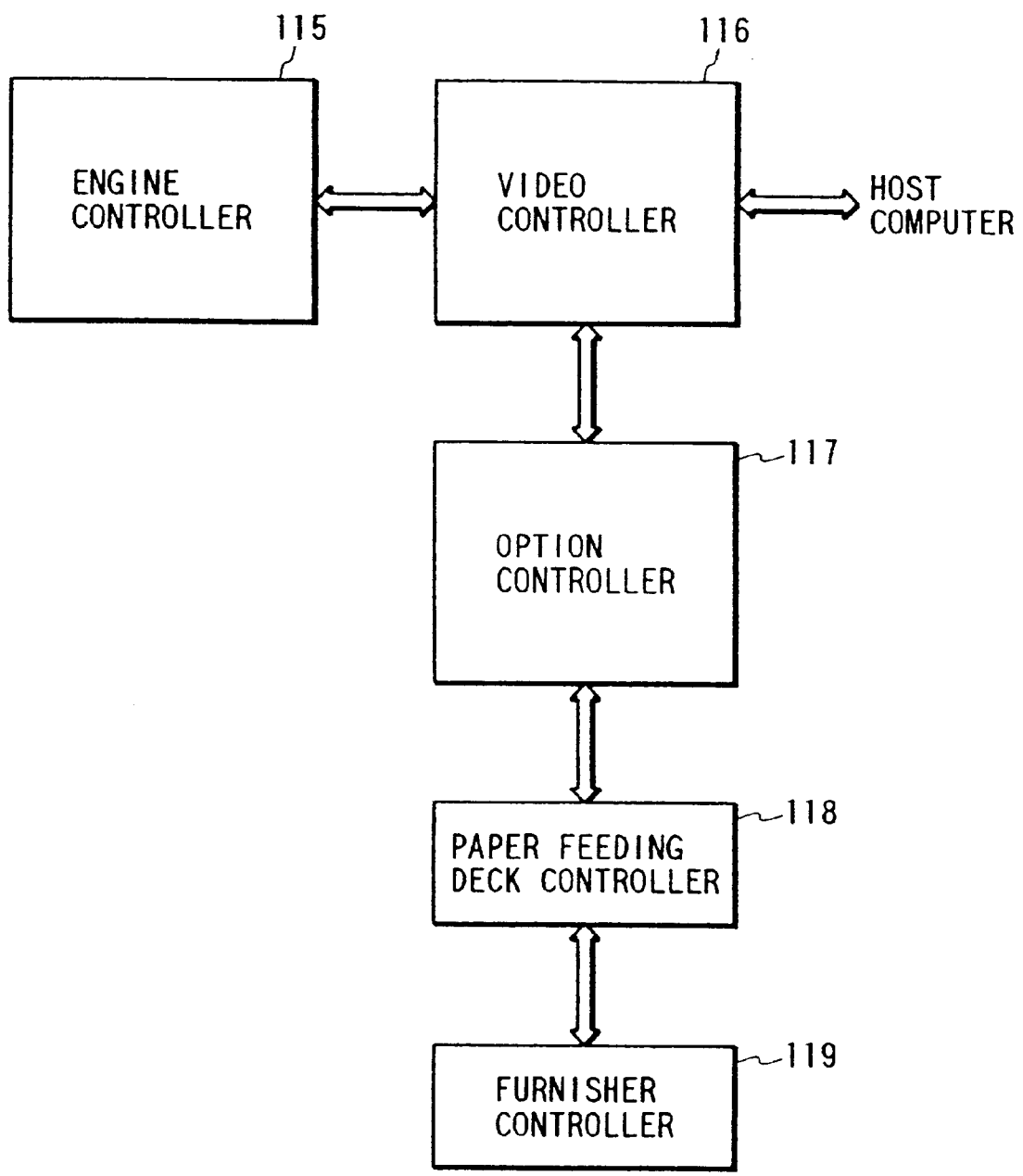
FIG. 12 is a block diagram of major control circuits.

FIG. 12 is a block diagram of the major control circuits. In it, 115 is the engine controller (image forming control device), which controls the image forming process of the image forming device 101 and the paper feed of paper feeding cassette 104. 116 is the video controller (image information control device), which develops the code signal for print received from the host computer into the image signal. 117 is the option controller (paper conveyance control device), which consistently and comprehensively controls the paper feeding deck 102 and the furnisher 103. 118 is the paper feeding deck controller, which controls the paper feeding deck 102. 119 is the furnisher controller, which controls the furnisher 103.

The video controller 116 is connected to the option controller 117 via the serial option controller interface. Also, the paper feeding deck controller 118 and the furnisher controller 119 are connected to the option controller 117 via the serial communication serial connection option interface.

Figure 11:
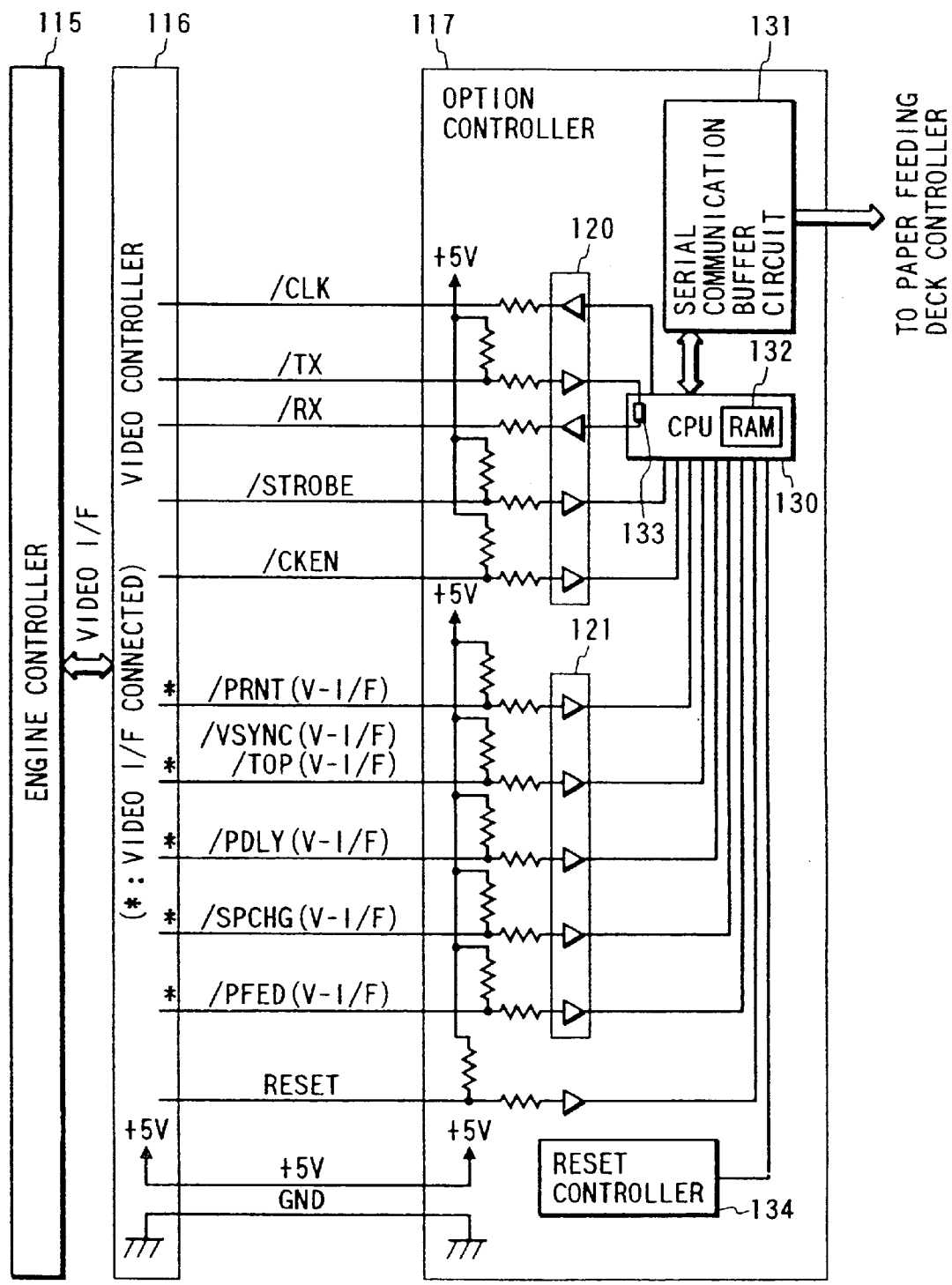
FIG. 11 is a circuit diagram centering on the paper conveyance control device.

FIG. 11 is a circuit diagram of the option controller 117. Major communication lines with the video controller 116 are /CLK, /TX, /RX, /STROBE and /CKEN. /CLK is the serial communication clock line. /TX is the send data line output by the video controller 116. /RX is the receive data line output by the option controller 117. /STROBE is the communication strobe line. The serial signal is transmitted when that signal is active. /CKEN is the clock enable signal. The option controller 117 is informed when that signal is active of that the video controller 116 is ready to receive the clock. "/" implies that the signal is low active.

Next, of the video interface, signals to be taken into the option controller 117 are explained.

/PRNT and /VSYNC signals:

The two signals above are essentially print control signals to be output to the engine controller 115 by the video controller 116. If using the option controller 117, the two signals above are to be branched in terms of hardware in the video controller 116 and are to be output to both of the engine controller 115 and the option controller 117. Of those, /PRNT, being a print command to the main body 101, commands to start the printing operation. In response to /PRNT, the image forming device 101 drives the paper feeding roller 105 and the conveying roller 113 if paper feed from the paper feeding cassette 104 and drives the conveying roller 113 if paper feed from the paper feeding deck 102. Also, the /VSYNC signal is a feed start command signal for the paper waiting at the registration roller 106.

/PDLV, /SPCHG and /PFED signals:

The three signals above are to be output by the engine controller 115. They notify of the paper ejecting timing from the main body of the engine (main body of image forming device) 101. If using the option controller 117, they are to be output to the option controller 117 through the video controller 116. The option controller 117, using the three signals above, controls the paper conveyance between the main body 101 of the engine and the paper feeding option (the paper feeding deck controller, furnisher controller) 118, 119.

Next, the interior of the option controller 117 is explained. 130 is the Central Processing Unit (CPU). It has the built-in RAM 132, ROM and serial I/O port 133. Incidentally, the RAM and ROM are expansible outside the CPU. 131 is the buffer circuit for serial communication with the controller 118, 119, being an optional unit. 120 is the buffer circuit for serial communication with the video controller 116. 121 is the receive buffer for taking, of the signals in the video interface between the engine controller 115 and the video controller 116, five signals into the option controller 117. The communication mode between the video controller 116 and the option controller 117 is in a system to use the RAM 132 of the CPU 130 mutually as the shared memory. Namely, the information to be mutually communicated is to be written at the designated address of the RAM and is to be read. For that, the TX signal from the video controller 116 is to be attached with a 2-byte address designation signal just before it when sending 1-byte data.

In such interfaces sharing the RAM, there is a collision problem of accessing the same address of the two CPU at once. To solve that problem, it is all right as well to adopt a method to have a dual port RAM having the arbitration function described earlier. In that case, the dual port RAM, being expensive, may raise the cost. In this embodiment, the RAM is accessed under the control of the CPU 130 using the built-in serial port 133 of the CPU 130. Its procedure is as follows. When 8-bit data is transmitted from the video controller 116 to the serial port 133, the serial port 133 interrupts the CPU 130. Then the CPU 130 takes in the contents of the serial port 133. The first two bytes of the TX data from the video controller 116 is the address of the RAM 132 and a read/write command. If a write command, the third byte is written at the designated address of the RAM 132. If a read command, the contents of the RAM 132 at the designated address is set in the serial port and the data is sent to the video controller 116 via the RX line at the third byte's clock. The CPU 130 starts the next operation by analyzing the data (command) from the video controller 116 written at the designated address of the RAM 132 as well as writing the status to be sent to the video controller 116 at the designated address for the status. There occurs no problem of the accessing by the two CPU at once since the CPU 130 manages the RAM 132.

Figure 13:
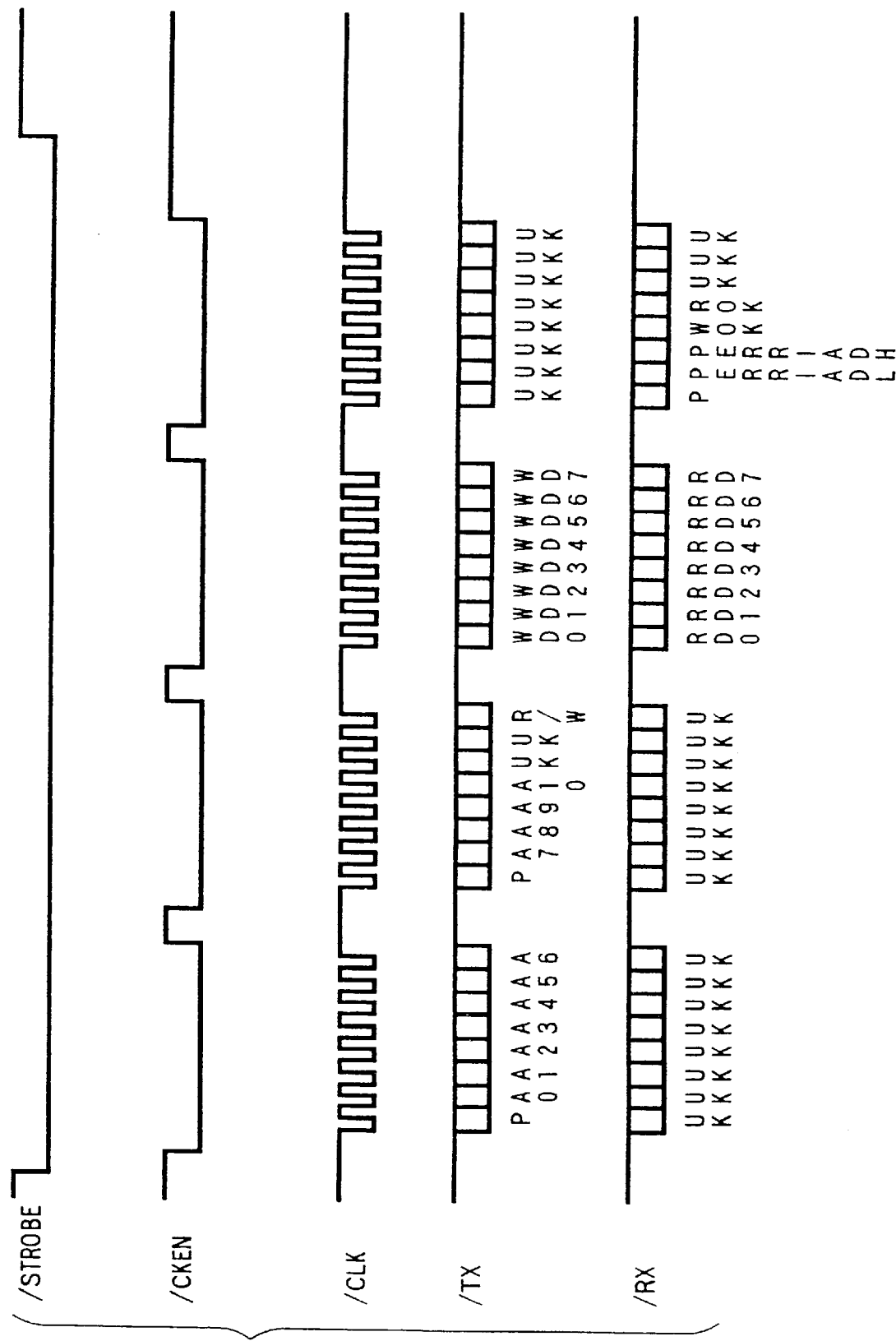
FIG. 13 is a communication timing chart of the image information control device and the paper conveyance control device.

FIG. 13 is a timing chart showing the communication timing and the data list of the video controller 116 and the option controller 117. Details of the timing and data are shown below.

(1) LSB first data.

(2) Odd parity (represented by P in drawings).

(3) A0–A10 (vertical writing in drawings) represent the address of the shared memory. WD0–WD7 (vertical writing in drawings) represent write data. RD0–RD7 represent read data from the shared memory.

(4) R/W (vertical writing in drawings) represents write if 1 (low) and read if 0 (high).

(5) If PERR-ADL (vertical writing in drawings) is 1 (low), it means that parity error has occurred in the received address information.

(6) WOK, ROK is turned 1 (low) when the option controller has successfully written or read data.

(7) UK (vertical writing in drawings) represents an indefinite value.

Figure 14:
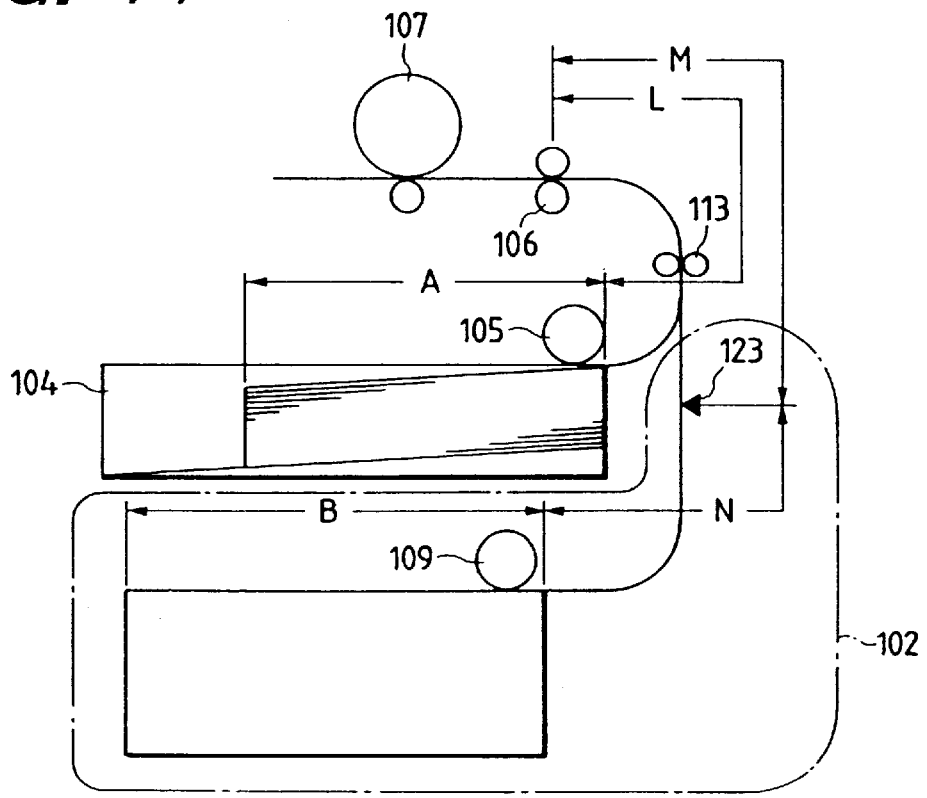
FIG. 14 is a dimensional drawing from the paper feeding part to the photosensitive drum.
Figure 15:
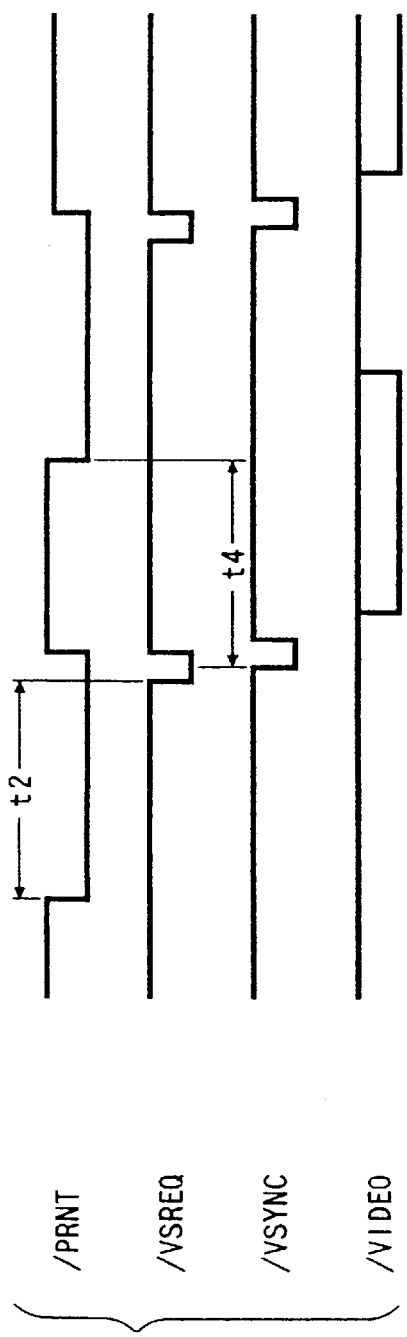
FIG. 15 is a control timing chart that applies if using the main body paper feeding cassette.

Next, paper conveyance control is explained. FIG. 14 shows the dimensions from the paper feeding part to the photosensitive drum. FIG. 15 is a timing chart concerning paper feed. The explanation is made below referring to FIGS. 14 and 15.

The video controller 116 gives a print command PRNT signal to the engine controller 115 when the code data to be printed is sent from the host computer to the video controller 116. When the PRNT signal turns true, the engine controller 115 starts feeding paper as well as initializing the photosensitive drum 107. Suppose the paper feeding cassette 104 has been designated as the paper feeding source, the paper feeding roller 105 turns to feed the paper.

The paper, moving along its conveying path, reaches the registration roller 106. It is assumed that L equal the moving distance of the tip of the paper in that case. If it is assumed that S equals the conveying speed, the time $t_1$ taken to reach the registration roller 106 is:

$$t_1 = L/S$$

Now the paper is looped after it reaches the registration roller 106 to make it contact the registration roller 106 surely and to align its tip. The moving size for that is called the loop size. It is assumed that P equals its length. If it is assumed that $t_2$ equals the time until the looping ends after receiving the PRNT signal, $t_2 = (L+P)/S$.

The engine controller 115 turns the /VSREQ signal true after the looping ends. The /VSREQ signal is one of the video interface signals sent from the engine controller 115 to the video controller 116. Paper conveyance halts when the /VSREQ signal turns true.

Then the video controller 116 turns the /VSYNC signal true when it senses that the /VSREQ signal is true. As a result, the engine controller 115 starts the registration roller 106. If it is assumed that A equals the paper length, the time $t_3$ taken for the paper to pass the registration roller 106 is:

$$t_3 = A/S$$

To feed the next paper, additionally, it is necessary to provide the distance Q from the preceding paper. In that case, the time $t_4$ from the tip of the /VSYNC signal to the next paper feeding timing is:

$$t_4 = (t_3 + Q/S) - t_2$$

Next, let us consider paper feed from the paper feeding deck 102. If paper feed from the paper feeding deck, the length from the registration roller 106 of the main body 1 to the paper feed starting position is, as known from FIG. 14, M+N (where N is the length from the tip of the paper loaded on the paper feeding deck 102 to the sensor 123). The paper sensor 123 is connected to the paper feeding deck controller 118. The length M+N is longer enough than the length B+Q of the paper to be set on the paper feeding deck. If the first sheet of paper is fed to the registration roller 106 and the next paper is fed after feeding out the first sheet of paper by the registration roller, therefore, the distance between sheets of paper becomes longer than the minimum required distance Q between sheets of paper. So the sensor 123 is provided to feed out the paper up to the position of the sensor 123 at the moment when paper feed from the paper feeding deck is determined.

When it is determined to feed paper from the paper feeding deck 102, the video controller 116 writes designation of the paper feeding deck in the job table of the shared memory of the option controller 117. The option controller 117 commands the paper feeding deck 102 to start feeding paper according to that designation. And upon detecting that the tip of the paper has reached the sensor 123, the paper feeding deck controller 118 halts paper conveyance as well as informing the option controller 117 of the arrival of the paper.

Figure 16:
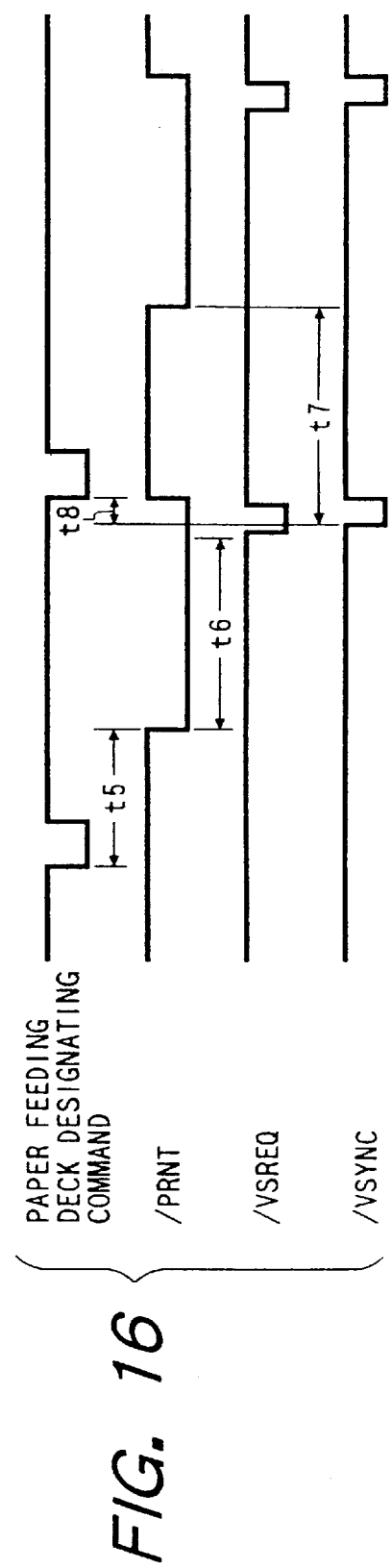
FIG. 16 is a control timing chart that applies if using the paper feeding deck.

As shown in FIG. 16, the time up to that moment is $t_5$, which is:

$$t_5 = N/S$$

That time $t_5$ is used also to detect whether the paper fed out by the paper feeding roller 109 has reached the sensor 123 in the designated time or not, i.e., jam.

The option controller 117 informs the video controller 116 immediately of print startable by writing in the paper feeding deck controller's 118 job table.

The video controller 116 commands to start printing by turning the /PRNT signal true. The option controller 117, detecting it, restarts the paper feeding deck to restart the paper.

The time $t_6$ taken from the paper being conveyed from the sensor 123 to it being looped by the registration roller 106 is:

$$t_6 = (M+P)/S$$

The time $t_7$ taken from the /VSYNC signal turning true and the registration roller 106 starting moving to the next /PRNT turning true is:

$$t_7 = (B+Q)/S - t_6$$

Incidentally, the time $t_8$ taken from /VSYNC turning true to the paper feeding deck designation command for the paper to be fed next, which is positive in FIG. 16, may become negative when N is long or when B is short. Namely, it must be started to feed paper from the next paper feeding deck before turning the /VSYNC of the preceding paper true in some cases. Now the times $t_1$ through $t_8$ being inherent in the main body and the paper feeding deck, $t_4$ and $t_7$ of them depend on the paper size.

The times $t_1$–$t_4$ concerning the cassette paper feed of the main body are recorded in the engine controller's 115 CPU's ROM and the times $t_5$–$t_8$ concerning the paper feeding deck are recorded in the ROM of the CPU of the paper feeding deck controller 118. The value recorded in the ROM of the CPU of the paper feeding deck controller 118 is used as read by the option controller 117.

The times is $t_5$–$t_8$ may change if the combination of the main body 101 and the paper feeding deck 102 changes. It can happen if there are two models of the main body and their paper conveying speeds differ or if the paper feeding deck has the speed changing function or if two or more models of the paper feeding deck are existing.

Therefore, the main body and the paper feeding deck are assigned the identification (ID) number and each ID number is stored in the engine controller 115 of the main body 101 and the paper feeding deck controller. It being called by the option controller, the values of $t_5$ through $t_8$ corresponding to the respective ID numbers are stored in the ROM of the option controller per paper size and are used as picked up.

Next, the paper ejecting processing time is explained. When stapling by the furnisher, the stapling time of the stapler 111 must be dealt with. When stapling ten sheets of paper in a bundle, they are stocked at the position of the stapler and then stapled and are ejected into the tray. It is assumed that the time taken for it is called the paper ejecting processing time $t_{11}$. Though it is desirable to be able to end that operation within the time $t_{10}$, which is the distance Q between sheets of paper/the conveying speed S, $t_{10}$ is actually exceeded. Also, it is assumed that the time of the paper ejecting processing time $t_{11}$–$t_{10}$ the paper ejecting processing overtime $t_{12}$.

$t_{12}$ represents the additional time by which it must be delayed to give a /PRNT signal at the print start time. The value of $t_{12}$ is to be stored in the ROM of the CPU of the furnisher controller 119 beforehand and is to be used as called by the option controller. When the paper ejecting processing time just becomes necessary, for example, the CPU of option controller 117 adds $t_{12}$ to the time $t_4$ shown in FIG. 6 and informs the video controller 116 of it and the video controller 116 delays the emission of the /PRNT signal.

Example of Variation 1

In embodiment 2, the respective values of timing required are recorded in the ROM of the option controller 116 or the ROM of the controller being an optional unit and are used as called by the option controller. The values of timing required increase, meanwhile, as the types of the main body and the option increase. And as the /VSYNC, /PRNT time, etc. differs also according to the paper size, they increase at a ratio of model x paper size to oppress the ROM's capacity.

Now there is a method to calculate the timing required by the option controller 117 by calling the conveying speed, conveying path from the main body or the optional unit. The values of paper sizes have been standardized. If the option controller 117 receives only the paper size code, therefore, it is possible to use the numeric value of the paper length per code by retrieving it from the ROM.

Example of Variation 2

In embodiment 2, the print command timings $t_4$ and $t_7$ are informed of with the option controller counting the time and writing in the shared memory of the option controller when the print command giving timing comes. In that case, there is an advantage that it is just enough for the video controller 116 to continue to monitor specific address of the shared memory. There is a disadvantage, however, that there may occur a lag from the timing required if there is a gap in the monitoring period. Now, to solve it, there is a method to determine the /PRNT outputting timing by informing the video controller 116 of the value of the time $t_4$ or $t_7$ from the option controller and with the video controller 116 counting the time from the /VSYNC output by itself. That method has an advantage that it is possible to determine the /PRNT outputting timing accurately.

As the first effect, it is possible to try to raise the essential printing operation speed of the image forming device as a result of the CPU of the option controller bearing the load of the CPU of the image forming control device and the load of the CPU of the image information control device.

As the second effect, there is scarcely a part to be in charge of the CPUs of the image forming control device and the image information control device since the control concerning the option controller is entrusted to the option controller. Even if the combination of the main body and the option is changed, therefore, there is scarcely a change in the image forming control device or the image information control device and it is enough to just give the information required of the conveying speed and the paper conveying path to the option controller. As a result, it is possible to change the combination of the main body and the optional unit freely.

As the third effect, it becomes possible to obtain the fastest throughput for the image forming device since the option controller determines the best paper conveying timing for the main body and the optional unit and paper conveyance is controlled accordingly.

As the fourth effect, it is possible to try to lower the cost by decreasing the number of signal lines by adopting serial transmission between the image information control device and the option controller as well as trying to lower the cost by making the arbitration function unnecessary while taking advantage of the merit of providing the shared RAM with the CPU of the option controller controlling the accessing timing to the shared RAM.

TABLE 1

EXAMPLE OF USE OF AREA WHERE CONVEYING SITUATION IS MANAGED
(EXAMPLE OF CONVEYING 8 SHEETS WITH 16 IMAGES USING TWO-SIDE UNIT)

CONVEYING SITUATION MANAGED AREA

| | CONDITION DESIGNATED AREA | | | | | | DESIGNATION OF PRINT CONDITION | | DESIGNATION OF PAPER FEEDING CONDITION |
|---|---|---|---|---|---|---|---|---|---|
| ITEM NO. PHYSICAL ADDRESS | 1 EXECUTION FLAG | 2 IMAGE NO. | 3 PAPER NO. | 4 COPY NO. | 5 JOB NO. | 6 PAPER SIZE | 7 PRINT MODE DESIGNATION | 8 PAPER FEEDING UNIT | 9 PAPER FEEDING STAGE |
| 000h | 1 | 1 | 1 | 1 | 1 | A4 | BLACK AND WHITE | MAIN BODY, UPPER STAGE | FFh |
| 018h | 1 | 2 | 2 | 2 | 1 | A4 | BLACK AND WHITE | MAIN BODY, UPPER STAGE | FFh |
| 030h | 1 | 3 | 1 | 1 | 1 | A4 | BLACK AND WHITE | TWO SIDES | FFh |
| 048h | 1 | 4 | 3 | 3 | 1 | A4 | BLACK AND WHITE | MAIN BODY, UPPER STAGE | FFh |
| 060h | 1 | 5 | 2 | 2 | 1 | A4 | BLACK AND WHITE | TWO SIDES | FFh |
| 078h | 1 | 6 | 4 | 4 | 1 | A4 | BLACK AND WHITE | MAIN BODY, UPPER STAGE | FFh |
| 090h | 1 | 7 | 3 | 3 | 1 | A4 | BLACK AND WHITE | TWO SIDES | FFh |
| 0A8h | 1 | 8 | 5 | 1 | 1 | LDR | BLACK AND WHITE | PAPER FEEDING NO. 1 | 3 |
| 0C0h | 1 | 9 | 4 | 4 | 1 | A4 | BLACK AND WHITE | TWO SIDES | FFh |
| 0D8h | 1 | 10 | 6 | 2 | 1 | LDR | BLACK AND WHITE | PAPER FEEDING NO. 1 | 3 |
| 0F0h | 1 | 11 | 5 | 1 | 1 | LDR | BLACK AND WHITE | TWO SIDES | FFh |
| 108h | 1 | 12 | 7 | 3 | 1 | LDR | BLACK AND WHITE | PAPER FEEDING NO. 1 | 3 |

TABLE 1-continued

EXAMPLE OF USE OF AREA WHERE CONVEYING SITUATION IS MANAGED
(EXAMPLE OF CONVEYING 8 SHEETS WITH 16 IMAGES USING TWO-SIDE UNIT)

CONVEYING SITUATION MANAGED AREA

| | CONDITION DESIGNATED AREA | | | | | DESIGNATION OF PRINT CONDITION | DESIGNATION OF PAPER FEEDING CONDITION | |
|---|---|---|---|---|---|---|---|---|
| ITEM NO. PHYSICAL ADDRESS | 1 EXECUTION FLAG | 2 IMAGE NO. | 3 PAPER NO. | 4 COPY NO. | 5 JOB NO. | 6 PAPER SIZE | 7 PRINT MODE DESIGNATION | 8 PAPER FEEDING UNIT | 9 PAPER FEEDING STAGE |
| 120h | 1 | 13 | 6 | 2 | 1 | LDR | BLACK AND WHITE | TWO SIDES | FFh |
| 138h | 1 | 14 | 8 | 4 | 1 | LDR | BLACK AND WHITE | PAPER FEEDING NO. 1 | 3 |
| 150h | 1 | 15 | 7 | 3 | 1 | LDR | BLACK AND WHITE | TWO SIDES | FFh |
| 168h | 2 | 16 | 8 | 4 | 1 | LDR | BLACK AND WHITE | TWO SIDES | FFh |
| 180h | 0 | 0 | 0 | 0 | 0 | 0 | 0 | 0 | 0 |
| | FINAL ACCESS(H) | FINAL ACCESS(L) | | | | | | | |
| 03D0h | 01h | 68h | | | | | | | |

TABLE 2

EXAMPLE OF USE OF AREA WHERE CONVEYING SITUATION IS MANAGED
(EXAMPLE OF CONVEYING 8 SHEETS WITH 16 IMAGES USING TWO-SIDE UNIT)

CONVEYING SITUATION MANAGED AREA

| | DESIGNATION OF PAPER EJECTING CONDITION | | | | | | | STATUS NOTIFIED AREA |
|---|---|---|---|---|---|---|---|---|
| ITEM NO. PHYSICAL ADDRESS | 10 PAPER EJECTING UNIT | 11 PAPER EJECTING STAGE | 12 PAPER EJECTING STATUS | 13 FURNISHER PROCESSING 1 | 14 FURNISHER PROCESSING 2 | 15 FURNISHER PROCESSING 3 | 16 SORT CONDITION | 17 PRINT PERMISSION FLAG |
| 000h | TWO SIDES | FFh | 0 | 0 | 0 | 0 | 0 | OK |
| 018h | TWO SIDES | FFh | 0 | 0 | 0 | 0 | 0 | OK |
| 030h | PAPER EJECTING NO. 1 | 1 | 0 | 0 | 0 | 0 | 0 | OK |
| 048h | TWO SIDES | FFh | 0 | 0 | 0 | 0 | 0 | OK |
| 060h | PAPER EJECTING NO. 1 | 2 | 0 | 0 | 0 | 0 | 0 | OK |
| 078h | TWO SIDES | FFh | 0 | 0 | 0 | 0 | 0 | OK |
| 090h | PAPER EJECTING NO. 1 | 3 | 0 | 0 | 0 | 0 | 0 | OK |
| 0A8h | TWO SIDES | FFh | 0 | 0 | 0 | 0 | 0 | OK |
| 0C0h | PAPER EJECTING NO. 1 | 4 | 0 | 0 | 0 | 0 | 0 | OK |
| 0D8h | TWO SIDES | FFh | 0 | 0 | 0 | 0 | 0 | DURING PREPARATION OF PAPER FEEDING UNIT |
| 0F0h | PAPER EJECTING NO. 1 | 1 | 0 | STAPLE | 0 | 0 | 0 | FFh |
| 108h | TWO SIDES | FFh | 0 | 0 | 0 | 0 | 0 | FFh |
| 120h | PAPER EJECTING NO. 1 | 2 | 0 | STAPLE | 0 | 0 | 0 | FFh |
| 138h | TWO SIDES | FFh | 0 | 0 | 0 | 0 | 0 | FFh |
| 150h | PAPER EJECTING NO. 1 | 3 | 0 | STAPLE | 0 | 0 | 0 | FFh |
| 168h | PAPER EJECTING NO. 1 | 4 | 0 | STAPLE | 0 | 0 | 0 | FFh |
| 180h 03D0h | 0 | 0 | 0 | 0 | 0 | 0 | 0 | 0 |

| | STATUS NOTIFIED AREA | | | | |
|---|---|---|---|---|---|
| ITEM NO. PHYSICAL ADDRESS | 18 RAM RELEASE | 19 PAPER FEEDING STATUS | 20 PRINT STATUS | 21 PAPER EJECTING STATUS | 22 FINAL END |
| 000h | OK | MAIN BODY PAPER FEEDING | PRINT START | PAPER EJECTING IN MAIN BODY | END |
| 018h | OK | MAIN BODY PAPER FEEDING | PRINT START | PAPER EJECTING IN MAIN BODY | END |
| 030h | OK | MAIN BODY PAPER FEEDING (TWO SIDES) | PRINT START | COMPLETION OF PAPER EJECTING UNIT | END |
| 048h | FFh | MAIN BODY PAPER FEEDING | PRINT START | PAPER EJECTING IN MAIN BODY | START |

TABLE 2-continued

EXAMPLE OF USE OF AREA WHERE CONVEYING SITUATION IS MANAGED
(EXAMPLE OF CONVEYING 8 SHEETS WITH 16 IMAGES USING TWO-SIDE UNIT)

CONVEYING SITUATION MANAGED AREA

| | | | | | |
|---|---|---|---|---|---|
| 060h | OK | MAIN BODY PAPER FEEDING (TWO SIDES) | PRINT START | COMPLETION OF PAPER EJECTING UNIT | END |
| 078h | FFh | MAIN BODY PAPER FEEDING | PRINT START | PAPER EJECTING IN MAIN BODY | START |
| 090h | FFh | MAIN BODY PAPER FEEDING (TWO SIDES) | PRINT START | EXECUTING PAPER EJECTING OPERATION | START |
| 0A8h | FFh | COMPLETION OF PAPER FEEDING UNIT | PRINT START | PAPER EJECTING IN MAIN BODY | START |
| 0C0h | FFh | MAIN BODY PAPER FEEDING (TWO SIDES) | PRINT START | FFh | START |
| 0D8h | FFh | EXECUTE PAPER FEEDING OPERATION | FFh | FFh | START |
| 0F0h | FFh | FFh | FFh | FFh | START |
| 108h | FFh | PREPARATION FOR PAPER FEEDING | FFh | FFh | START |
| 120h | FFh | FFh | FFh | FFh | START |
| 138h | FFh | PREPARATION FOR PAPER FEEDING | FFh | FFh | START |
| 150h | FFh | FFh | FFh | FFh | START |
| 168h | FFh | FFh | FFh | FFh | START |
| 180h | 0 | 0 | | 0 | 0 |
| 03D0h | | | | | |

TABLE 3

CONVEYING SITUATION MANAGED AREA DATA SPECIFICATION

| ITEM NO. | NAME | SUMMARY | DATA STRUCTURE | DATA DIRECTION | DETAIL OF CONTENTS OF DATA |
|---|---|---|---|---|---|
| | PHYSICAL ADDRESS | ACTUAL ADDRESS OF DUAL PORT MEMORY IS INDICATED. | 11-BIT HEX | | 000h–7FFh |
| 1 | EXECUTION FLAG | INSTRUCTION OF START OF OPERATION AND INSTRUCTION OF RETRY | COMMAND TYPE | C → OC | 1...EXECUTE NORMAL OPERATION IN ACCORDANCE WITH PAPER FEEDING/EJECTING DATA<br><br>2...PAPER FEEDING/EJECTING DATA IS WRITTEN, BUT OPERATION MUST NOT BE DONE.<br>3...RETRY IN ACCORDANCE WITH PAPER FEEDING/EJECTING CONDITION WHICH HAS BEEN ALREADY WRITTEN.<br>4...STOP TEMPORARILY PAPER FEEDING FOR PAPER FEEDING CONDITION WHICH HAS BEEN ALREADY WRITTEN.<br>5...STOP TEMPORARILY PAPER EJECTING FOR PAPER EJECTING CONDITION WHICH HAS BEEN ALREADY WRITTEN.<br>6...STOP TEMPORARILY PAPER CONVEYING FOR PAPER FEEDING/EJECTING CONDITION WHICH HAS BEEN ALREADY WRITTEN. |
| 2 | IMAGE NO. | ORDER FOR PRINTING IMAGE IN MAIN BODY IS INDICATED. | 8-BIT HEX | C → OC | 01h–FFh |
| 3 | PAPER NO. | NUMBER CORRESPONDING TO NUMBER OF PAPER IS INDICATED. | 8-BIT HEX | C → OC | 01h–FFh |
| 4 | COPY NO. | NUMBER OF SAME PRINT SCREEN IS INDICATED. | 8-BIT HEX | C → OC | 01h–FFh (FFh...DON'T CARE) |
| 5 | JOB NO. | JOB NO. FOR EXECUTING PROCESSING OF INTERRUPTION PRINT. | 8-BIT HEX | C → OC | 01h–FFh (FFh...DON'T CARE) |
| 6 | PAPER SIZE | PAPER SIZE TO BE PROCESSED | COMMAND TYPE | C → OC | PAPER SIZE CODE (ATTACHED SHEET : SEE PAPER SIZE CODE) |
| 7 | PRINT MODE DESIGNATION | PRINT MODE IS DESIGNATED. (COLOR, MONOCHROME, etc.) | COMMAND TYPE | C → OC | 1...MONOCHROME MACHINE<br>2...COLOR MACHINE (FULL COLOR MODE)<br>3...COLOR MACHINE (MONO COLOR MODE)<br>4...COLOR MACHINE (FAST PRINT MODE)<br>FFh ... DON'T CARE |
| 8 | PAPER FEEDING UNIT | UNIT TO BE PAPER-FED IS DESIGNATED. | COMMAND TYPE | C → OC | 1...PAPER FEEDING UNIT 1<br><br>2...PAPER FEEDING UNIT 2<br>3...PAPER FEEDING UNIT 3 |

TABLE 3-continued

CONVEYING SITUATION MANAGED AREA DATA SPECIFICATION

| ITEM NO. | NAME | SUMMARY | DATA STRUCTURE | DATA DIRECTION | DETAIL OF CONTENTS OF DATA |
|---|---|---|---|---|---|
| | | | | | 4...PAPER FEEDING UNIT 4<br>5...PAPER FEEDING UNIT 5<br>10...PAPER FEEDING IN MAIN BODY (UPPER STAGE, LOWER STAGE, MPT, ENVELOPE) |

TABLE 4

CONVEYING SITUATION MANAGED AREA DATA SPECIFICATION

| ITEM NO. | NAME | SUMMARY | DATA STRUCTURE | DATA DIRECTION | DETAIL OF CONTENTS OF DATA |
|---|---|---|---|---|---|
| 8 | | | | | 11...PAPER FEEDING IN MAIN BODY (BOTH SIDES) |
| 9 | PAPER FEEDING STAGE | STAGE TO WHICH PAPER IS TO BE FED IS DESIGNATED. | 8-BIT HEX | C → OC | 01h–FEb (NUMBER OF STAGES)<br>(FFh...DON'T CARE) |
| 10 | PAPER EJECTING UNIT | UNIT TO WHICH PAPER IS TO BE EJECTED DESIGNATED. | COMMAND TYPE | C → OC | 1...PAPER EJECTING UNIT 1<br><br>2...PAPER EJECTING UNIT 2<br>3...PAPER EJECTING UNIT 3<br>4...PAPER EJECTING UNIT 4<br>5...PAPER EJECTING UNIT 5<br>10...PAPER FEEDING IN MAIN BODY (FACE DOWN)<br>11...PAPER FEEDING IN MAIN BODY (TWO SIDES) |
| 11 | PAPER EJECTING STAGE | STAGE TO WHICH PAPER IS TO BE EJECTED IS DESIGNATED. | 8-BIT HEX | C → OC | 01h–FEh (NUMBER OF STAGES)<br>(FFh...DON'T CARE) |
| 12 | PAPER EJECTING STATUS | STATUS OF PAPER UPON PAPER EJECTION IS DESIGNATED. | BIT UNIT DESIGNATION | C → OC | D0...(0...FACE DOWN/1...FACE UP)<br><br>D1...(0...JOB-OFFSET-FF/1...JOB-OFFSET-ON)<br>0...NO SPECIFIC DESIGNATION OF OPERATION |
| 13 | FURNISHER PROCESSING 1 | DESIGNATION OF FURNISHER PROCESSING IS PERFORMED. (FIRST-BYTE) | BIT UNIT DESIGNATION | C → OC | D0...PREPARE STAPLE<br><br>D1...EXECUTE STAPLE<br>D2...PREPARE FOLDING IN TWO<br>D3...EXECUTE FOLDING IN TWO<br>D4...PREPARE FOLDING IN Z FORM<br>D5...EXECUTE FOLDING IN Z FORM<br>D6...PREPARE PUNCHING<br>D7...EXECUTE PUNCHING<br>0...NO SPECIFIC DESIGNATION OF OPERATION |
| 14 | FURNISHER PROCESSING 2 | DESIGNATION OF FURNISHER PROCESSING IS PERFORMED. (SECOND-BYTE) | BIT UNIT DESIGNATION | C → OC | D0...PREPARE PASTING<br><br>D1...EXECUTE PASTING<br>D2...PREPARE SADDLE STITCH<br>D3...EXECUTE SADDLE STITCH<br>D4...UNDEFINED D5...UNDEFINED D6...UNDEFINED<br>D7...UNDEFINED<br>0...NO SPECIFIC DESIGNATION OF OPERATION |

TABLE 5

CONVEYING SITUATION MANAGED AREA DATA SPECIFICATION

| ITEM NO. | NAME | SUMMARY | DATA STRUCTURE | DATA DIRECTION | DETAIL OF CONTENTS OF DATA |
|---|---|---|---|---|---|
| 15 | FURNISHER PROCESSING 3 | DESIGNATION OF FURNISHER PROCESSING IS PERFORMED. (THIRD-BYTE) | BIT UNIT DESIGNATION | C → OC | UNDEFINED<br><br>0...NO SPECIFIC DESIGNATION OF OPERATION |

TABLE 5-continued

CONVEYING SITUATION MANAGED AREA DATA SPECIFICATION

| ITEM NO. | NAME | SUMMARY | DATA STRUCTURE | DATA DIRECTION | DETAIL OF CONTENTS OF DATA |
|---|---|---|---|---|---|
| 16 | SORT CONDITION | OPERATION OF SORTER IS DESIGNATED. | BIT UNIT DESIGNATION | C → OC | D0...RANDOM SORT/SEQUENTIAL SORT DESIGNATION<br>D1...UNDEFINED<br>0...NO SPECIFIC DESIGNATION OF OPERATION |
| 17 | PRINT PERMISSION FLAG | WHETHER IT IS READY TO PRINT OR NOT IS NOTIFIED. | BIT UNIT DESIGNATION | C → OC | D0...1-DURING PREPARATION FOR PAPER FEEDING UNIT |
| 17 | | | | | D1...1-NO PAPER IN PAPER FEEDING UNIT, INCONSISTENCY OF PAPER SIZE<br>D2...1-IMPOSSIBILITY OF OPERATION OF PAPER FEEDING UNIT (JAM, MALFUNCTION, etc.)<br>D3...1-UNDEFINED<br>D4...1-DURING PREPARATION OF PAPER EJECTING UNIT<br>D5...1-FULL PAPER IN PAPER EJECTING UNIT, INCONSISTENCY OF PAPER SIZE<br>D6...1-IMPOSSIBILITY OF OPERATION OF PAPER EJECTING UNIT (JAM, MALFUNCTION, ETC.)<br>D7...UNDEFINED<br>PRINT MAY BE EXECUTED IF ALL OF ABOVE D0–D7 ARE 0.<br>TIMING OF PRINT START IS CONTROLLED BY THIS STATUS.<br>FFh...START STATUS |
| 18 | RAM RELEASE FLAG | PERMISSION FOR DISCARD OF PRINT DATA | COMMAND TYPE | C ← OC | 1...RAM RELEASE OK<br><br>FFh...START STATUS |
| 19 | PAPER FEEDING STATUS | EXECUTION OF PAPER FEEDING AND EJECTION FROM PAPER FEEDING UNIT IS NOTIFIED. | COMMAND TYPE | C ← OC | 1...DURING OPERATION OF PREPARING PAPER FEEDING<br>2...EXECUTE PAPER FEEDING OPERATION<br>3...DURING CONVEYING OPERATION INTO MAIN BODY<br>4...COMPLETION OF PAPER FEEDING UNIT PAPER EJECTING STATUS TO ABOVE PAPER FEEDING UNIT IS WRITTEN FROM PHC SIDE. |
| 19 | | | | C → OC | 10...EXECUTE PAPER FEEDING OPERATION IN MAIN BODY.<br>PAPER FEEDING STATUS FROM ABOVE PAPER FEEDING UNIT IS WRITTEN FROM VIDEO CONTROLLER SIDE.<br>FFh...START STATUS |
| 20 | PRINT STATUS | PRINT STATUS IN MAIN BODY IS UPDATED. | COMMAND TYPE | C → OC | 1...START PRINT OPERATION<br><br>UNIT IS WRITTEN FROM VIDEO CONTROLLER SIDE.<br>FFh...START STATUS |

TABLE 6

CONVEYING SITUATION MANAGED AREA DATA SPECIFICATION

| ITEM NO. | NAME | SUMMARY | DATA STRUCTURE | DATA DIRECTION | DETAIL OF CONTENTS OF DATA |
|---|---|---|---|---|---|
| 21 | PAPER EJECTING STATUS | EXECUTION OF PAPER EJECTION AND PROCESSING STATUS OF PAPER EJECTING UNIT ARE NOTIFIED. | COMMAND TYPE | C ← OC | 1...DURING OPERATION OF PREPARATING PAPER EJECTING<br><br>2...EXECUTE PAPER EJECTING OPERATION<br>3...DURING CONVEYING OPERATION FROM MAIN BODY<br>4...DURING OPERATION OF FURNISHER PROCESSING<br>5...COMPLETION OF PAPER EJECTING UNIT PAPER EJECTING STATUS TO ABOVE PAPER EJECTING UNIT IS WRITTEN FROM PHC SIDE. |

TABLE 6-continued

CONVEYING SITUATION MANAGED AREA DATA SPECIFICATION

| ITEM NO. | NAME | SUMMARY | DATA STRUCTURE | DATA DIRECTION | DETAIL OF CONTENTS OF DATA |
|---|---|---|---|---|---|
| 21 | | | | C → OC | 10...EXECUTE PAPER EJECTING OPERATION IN MAIN BODY<br>PAPER EJECTING STATUS FROM ABOVE MAIN BODY IS WRITTEN FROM VIDEO CONTROLLER SIDE.<br>FFh...START STATUS |
| 22 | FINAL END | COMPLETE END OF PROCESSING OF PAPER EJECTING UNIT IS NOTIFIED. | COMMAND TYPE | C → OC | 1...ALL PROCESSING ARE ENDED.<br><br>FFh...START STATUS |

TABLE 7

| | CONDITION DESIGNATED AREA | | | | | STATUS NOTIFIED AREA | |
|---|---|---|---|---|---|---|---|
| ITEM NO.<br>PHYSICAL ADDRESS | 1<br>EXECUTION FLAG | 2<br>IMAGE NO. | 5<br>JOB NO. | 10<br>PAPER EJECTING UNIT | 13<br>FURNISHER PROCESSING 1 | 17<br>PRINT PERMISSION FLAG | 23<br>INTERRUPTION PROCESSING |
| 000h | 1 | 1 | 1 | NO. 1 | 0 | OK | 0 |
| 018h | 1 | 2 | 1 | NO. 1 | 0 | OK | 0 |
| 030h | 1 | 3 | 1 | NO. 1 | 0 | OK | 0 |
| 048h | 1 | 4 | 1 | NO. 1 | 0 | OK | 0 |
| 060h | 1 | 5 | 1 | NO. 1 | 0 | OK | 0 |
| 078h | 1 | 6 | 1 | NO. 1 | 0 | OK | 0 |
| 090h | 1 | 7 | 1 | NO. 1 | 0 | OK | 0 |
| 0A8h | 1 | 8 | 2 | NO. 2 | 0 | 0 | 1 |
| 0C0h | 1 | 9 | 2 | NO. 2 | 0 | 0 | 1 |
| 0D8h | 1 | 10 | 2 | NO. 2 | 0 | 0 | 1 |
| 0F0h | 1 | 11 | 1 | NO. 1 | 0 | OK | 0 |
| 108h | 1 | 12 | 1 | NO. 1 | 0 | OK | 0 |
| 120h | 1 | 13 | 1 | NO. 1 | STAPLE | OK | 0 |
| 138h | 1 | 14 | 3 | NO. 1 | 0 | 0 | 0 |
| 150h | 1 | 15 | 3 | NO. 1 | 0 | 0 | 0 |
| 168h | 2 | 16 | 3 | NO. 1 | 0 | 0 | 0 |
| 180h | 0 | 0 | 0 | 0 | 0 | 0 | 0 |

What is claimed is:

1. An optional device controller for controlling at least one optional device which handles paper and is connected to an image recording apparatus, said optional device controller comprising:

attaching means for attaching said optional device controller to the image recording apparatus;

first receiving means for receiving, via said attaching means, control data for processing a print job and relating to each page in the print job from a control part provided in the image recording apparatus, said control data being data for feeding or discharging a paper in order to control said optional device;

memory means capable of storing a plurality of pages of said control data received by said first receiving means; and control means for controlling the optional device based on the plurality of pages of said control data stored in said memory means.

2. An optional device controller according to claim 1, wherein said first receiving means serially receives said control data from said control part to be written into said memory means.

3. An optional device controller according to claim 1, wherein said memory means has a condition designation area capable of storing said control data and a status notification area capable of storing data relating to paper conveying status for each page in a print job.

4. An optional device controller according to claim 3, wherein the condition designation area includes an execution flag area for storing data indicating that condition designation has been performed for each page by the image recording apparatus.

5. An optional device controller according to claim 4, wherein if the execution flag area does not store the data, said control means controls the optional device not to start paper conveyance.

6. An optional device controller according to claim 3, wherein paper conveying status in the image recording apparatus is written into the status notification area of said memory means based on information from said control part.

7. An optional device controller according to claim 1, wherein said memory means has a job identification area for storing print job identification data for each page.

8. An optional device controller according to claim 1, wherein said first receiving means receives said control data in parallel from the control part to be written into said memory means.

9. An optional device controller according to claim 1, further comprising a second receiving means for receiving data relating to paper conveying status for each page in a print job from said optional device.

10. An optional device controller for controlling at least one optional device which handles paper and is connected to an image recording apparatus, said optional device controller comprising:
  attaching means for attaching said optional device controller to the image recording apparatus;
  first receiving means for receiving data relating to each page in a print job transmitted from the image recording apparatus via said attaching means;
  memory means capable of storing a plurality of pages of the data received by said first receiving means;
  control means for controlling the optional device based on the plurality of pages of the received data stored in said memory means; and
  discrimination means for making a discrimination based on data stored in said memory means as to whether a print job is to be interrupted and another print job is to be executed, wherein said memory means has an area for storing results of the discrimination made by said discrimination means.

11. An optional device controller for controlling at least one optional device which handles paper and is connected to an image recording apparatus, said optional device controller comprising:
  attaching means for attaching said optional device controller to the image recording apparatus;
  first receiving means for receiving data relating to each page in a print job transmitted from the image recording apparatus via said attaching means;
  memory means capable of storing a plurality of pages of the data received by said first receiving means; and
  control means for controlling the optional device based on the plurality of pages of the received data stored in said memory means,
  wherein if a duplex print unit is connected to the image recording apparatus as the optional device, the duplex print unit may be designated as a sheet ejection port to which a sheet with data recorded on one side is to be ejected and a sheet feed port from which a sheet with data recorded on one side is to be fed for duplex printing.

12. An image recording system including an image recording apparatus and an optional device controller for controlling at least one optional device which handles paper, said system comprising attaching means for attaching said image recording apparatus to said optional device controller,
  wherein said image recording apparatus comprises first transmitting means for transmitting data relating to each page in a print job to said optional device control means via said attaching means; and
  wherein said optional device controller comprises:
    first receiving means for receiving, via said attaching means, control data relating to each page in a print job from the control part, said control data comprising data for feeding or discharging a paper in order to control said optional device;
    memory means capable of storing a plurality of pages of said control data received by said first receiving means; and
    control means for controlling said optional device based on said control data stored in said memory means.

13. An image recording system according to claim 12, wherein said first receiving means serially receives said control data from the control part to be written into said memory means.

14. An image recording system according to claim 12, wherein said memory means has a condition designation area for storing said control data and a status notification area for storing data relating to paper conveying status for each page in a print job.

15. An image recording system according to claim 14, wherein said condition designation area includes an execution flag area for storing data indicating that condition designation has been performed for each page by the image recording apparatus.

16. An image recording system according to claim 15, wherein if the execution flag area does not store the data, said control means controls the optional device not to start paper conveyance.

17. An image recording system according to claim 14, wherein paper conveying status in the image recording apparatus is written into the status notification area of said memory means based on information from the image recording apparatus.

18. An image recording system according to claim 12, wherein said memory means has a job identification area for storing print job identification data for each page.

19. An image recording system according to claim 12, wherein said first receiving means in parallel receives said control data from the control part to be written into said memory means.

20. An image recording system according to claim 12, further comprising a second receiving means for receiving data relating to paper conveying status for each page in a print job from said optional device.

21. An image recording system including an image recording apparatus and an optional device controller for controlling at least one optional device which handles paper, said system comprising attaching means for attaching said image recording apparatus to said optional device controller,
  wherein said image recording apparatus comprises first transmitting means for transmitting data relating to each page in a print job to said optional device control means via said attaching means; and
  wherein said image recording apparatus comprises first transmitting means for transmitting data relating to each page in a print job to said optional device control means via said attaching means; and
  wherein said optional device controller comprises:
    memory means capable of storing a plurality of pages of the data transmitted by said first transmitting means;
    control means for controlling the optional device based on the plurality of pages of the transmitted data stored in said memory means; and
    discrimination means for making a discrimination based on data stored in said memory means as to whether a print job is to be interrupted and another print job is to be executed, wherein said memory means has an area for storing results of the discrimination made by said discrimination means.

22. An image recording system including an image recording apparatus and an optional device controller for controlling at least one optional device which handles paper, said system comprising attaching means for attaching said image recording apparatus to said optional device controller,
  wherein said image recording apparatus comprises first transmitting means for transmitting data relating to each page in a print job to said optional device control means via said attaching means; and
  wherein said optional device controller comprises:
    memory means capable of storing a plurality of pages of the data transmitted by said first transmitting means; and control means for controlling the optional device based on the plurality of pages of the transmitted data stored in said memory means, wherein if a duplex print unit is connected to said image recording apparatus as the optional device, the duplex print unit may be designated as a sheet ejection port to which a sheet with data recorded on one side is to be ejected and a sheet feed port from which a sheet with data recorded on one side is to be fed for duplex printing.

23. An optional device controller for controlling at least one optional device which handles paper and is connected to an image recording apparatus, said optional device controller comprising:

first transmitting portion adapted to transmit control data for processing a print job and relating to each page in the print job from a control part provided in the image recording apparatus, said control data being data for feeding or discharging a paper in order to control said optional device;

memory capable of storing a plurality of pages of said control data from the control part via said first transmitting portion; and control unit adapted to control the optional device based on the plurality of pages of said control data stored in said memory.

24. An optional device controller according to claim 23, wherein said first transmitting portion has a serial communication line adapted to transmit said control data serially.

25. An optional device controller according to claim 23, wherein said first transmitting portion has a parallel communication line adapted to transmit said control data.

26. An optional device controller according to claim 23, wherein said memory has a condition designation area capable of storing said control data and a status notification area capable of storing data relating to paper conveying status for each page in a print job.

27. An optional device controller according to claim 26, wherein aid condition designation area includes an execution flag area for storing data indicating that condition designation has been performed for each page by the image recording apparatus.

28. An option device controller according to claim 27, wherein if the execution flag area does not store the data, said control unit controls the optional device not to start paper conveyance.

29. An optional device controller according to claim 26, wherein paper conveying status in the image recording apparatus is written into the status notification area of said memory based on information from the control part.

30. An optional device controller according to claim 23, wherein said memory has a job identification area capable of storing print job identification data for each page.

31. An image recording system including an image recording apparatus and an optional device controller for controlling at least one optional device which handles paper, wherein said image recording apparatus comprises a control part provided in the image recording apparatus for executing a processing for the print job; and wherein said optional device controller comprises:

first transmitting portion adapted to transmit control data relating to each page in a print job from the control part, said control data being data for feeding or discharging a paper in order to control said optional device;

memory capable of storing a plurality of pages of said control data from the control part via said first transmitting portion; and control unit adapted to control the optional device based on the plurality of pages of said control data stored in said memory.

32. An image recording system according to claim 31, wherein said first transmitting portion has a serial communication line adapted to transmit said control data serially.

33. An image recording system according to claim 31, wherein said first transmitting portion has a parallel communication line adapted to transmit said control data in parallel.

34. An image recording system according to claim 31, wherein said memory has a condition designation area capable of storing said control data and a status notification area capable of storing data relating to paper conveying status for each page in a print job.

35. An image recording system according to claim 34, wherein said condition designation area includes an execution flag area for storing data indicating that condition designation has been performed for each page by the image recording apparatus.

36. An image recording system according to claim 35, wherein if the execution flag area does not store the data, said control unit controls the optional device not to start paper conveyance.

37. An image recording system according to claim 34, wherein paper conveying status in the image recording apparatus is written into the status notification area of said memory based on information from the control part.

38. An image recording system according to claim 31, wherein said memory has a job identification area capable of storing print job identification data for each page.

* * * * *

UNITED STATES PATENT AND TRADEMARK OFFICE
CERTIFICATE OF CORRECTION

PATENT NO.     : 6,624,904 B2
DATED          : September 23, 2003
INVENTOR(S)    : Junichi Kimizuka et al.

It is certified that error appears in the above-identified patent and that said Letters Patent is hereby corrected as shown below:

Column 5,
Line 55, "unit" should read -- unit, --.

Column 12,
Line 12, "to get" should read -- from getting --.

Column 13,
Line 32, "of" should read -- so --.

Column 31,
Line 39, "aid" should read -- said --.

Signed and Sealed this

Fourteenth Day of September, 2004

JON W. DUDAS
*Director of the United States Patent and Trademark Office*